United States Patent
Henderson et al.

(10) Patent No.: US 10,420,150 B2
(45) Date of Patent: *Sep. 17, 2019

(54) AUTOMATED WIRELESS ACCESS POINT RESOURCE ALLOCATION AND OPTIMIZATION

(71) Applicant: AT&T Mobility II LLC, Atlanta, GA (US)

(72) Inventors: Thomas Wallace Henderson, Alpharetta, GA (US); Kurt Huber, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,331

(22) Filed: Oct. 18, 2017

(65) Prior Publication Data
US 2018/0041916 A1 Feb. 8, 2018

Related U.S. Application Data

(63) Continuation of application No. 12/843,363, filed on Jul. 26, 2010, now Pat. No. 9,801,095.

(51) Int. Cl.
*H04W 28/16* (2009.01)
*H04W 16/18* (2009.01)
(Continued)

(52) U.S. Cl.
CPC ....... *H04W 74/085* (2013.01); *H04L 41/0886* (2013.01); *H04W 16/10* (2013.01);
(Continued)

(58) Field of Classification Search
CPC ... H04W 28/16; H04W 72/04; H04W 74/085; H04W 16/10; H04W 16/18; H04L 41/0886
See application file for complete search history.

(56) References Cited

U.S. PATENT DOCUMENTS

| | | | |
|---|---|---|---|
| 7,518,486 B1 * | 4/2009 | Beardall | B60R 25/04 235/375 |
| 2004/0051664 A1 | 3/2004 | Frank | |

(Continued)

OTHER PUBLICATIONS

Aricent, Inc., "Challenges in Deployment of UMTS/HSPA Femtocell" Aricent.com White Paper, 2008 Aricent, Inc. http://www.femtoforum.org/femto/Files/File/Femtocell_Deployment_Whitepaper_20fEB%5C'08.pdf.

(Continued)

*Primary Examiner* — Yemane Mesfin
*Assistant Examiner* — Henry Baron
(74) *Attorney, Agent, or Firm* — Amin, Turocy & Watson, LLP

(57) ABSTRACT

Automated wireless access point resource allocation and optimization are facilitated. An external data store (EDS) component can automatically select, based on spatial data of at least one polygon including at least one wireless access point, one or more parameters associated with wireless communications of the at least one wireless access point. Further, an access point provisioning gateway (APPG) can remotely initiate the at least one wireless access point to automatically configure equipment of the at least one wireless access point to service the wireless communications using at least one of the one or more parameters. Furthermore, a boundary generation component can automatically generate the spatial data by at least one of: combining spatial data of two or more polygons; splitting a polygon into at least two polygons; or expanding a boundary of the polygon.

20 Claims, 21 Drawing Sheets

(51) Int. Cl.
  *H04L 12/24* (2006.01)
  *H04W 72/04* (2009.01)
  *H04W 16/10* (2009.01)
  *H04W 74/08* (2009.01)
  *H04B 17/382* (2015.01)
  *H04W 16/24* (2009.01)
  *H04W 24/02* (2009.01)

(52) U.S. Cl.
  CPC ........... *H04W 16/18* (2013.01); *H04W 28/16* (2013.01); *H04W 72/04* (2013.01); *H04B 17/382* (2015.01); *H04W 16/24* (2013.01); *H04W 24/02* (2013.01)

(56) References Cited

U.S. PATENT DOCUMENTS

| | | | |
|---|---|---|---|
| 2007/0082677 A1* | 4/2007 | Donald Hart | H04W 16/18 455/456.1 |
| 2008/0259606 A1 | 10/2008 | Chen | |
| 2009/0207824 A1 | 8/2009 | Lee et al. | |
| 2010/0323745 A1 | 12/2010 | Chen et al. | |
| 2011/0165892 A1 | 7/2011 | Ristich et al. | |
| 2013/0007871 A1* | 1/2013 | Meenan | H04L 12/66 726/12 |
| 2013/0196692 A1 | 8/2013 | Huang et al. | |

OTHER PUBLICATIONS

Office Action dated May 10, 2013 for U.S. Appl. No. 12/843,363, 33 pages.
Office Action dated Jul. 15, 2016 for U.S. Appl. No. 12/843,363, 44 pages.
Office Action dated Oct. 20, 2015 for U.S. Appl. No. 12/843,363, 47 pages.
Office Action dated Dec. 2, 2014 for U.S. Appl. No. 12/843,363, 40 pages.
Office Action dated Mar. 25, 2016 for U.S. Appl. No. 12/843,363, 48 pages.
Office Action dated May 1, 2015 for U.S. Appl. No. 12/843,363, 44 pages.
Office Action dated Jul. 16, 2014 for U.S. Appl. No. 12/843,363, 35 pages.
Office Action dated Oct. 24, 2012 for U.S. Appl. No. 12/843,363, 24 pages.
Office Action dated Dec. 30, 2016 for U.S. Appl. No. 12/843,363, 51 pages.

* cited by examiner

AUTOMATED WIRELESS ACCESS POINT RESOURCE ALLOCATION AND OPTIMIZATION

CROSS REFERENCE

This patent application is a continuation of, and claims priority to, U.S. patent application Ser. No. 12/843,363, filed on Jul. 26, 2010, and entitled "AUTOMATED WIRELESS ACCESS POINT RESOURCE ALLOCATION AND OPTIMIZATION" (now U.S. Pat. No. 9,801,095). The entirety of the aforementioned application is hereby incorporated by reference herein.

TECHNICAL FIELD

This disclosure relates generally to wireless network resource allocation including, but not limited to, automated wireless access point resource allocation and optimization.

BACKGROUND

Wireless devices, e.g., cellular-based devices, are ubiquitous. Such devices wirelessly transmit/receive signals to/from access points connected to a network of a service provider based on one or more designated parameters, i.e., a frequency, a location area code (LAC), a service area indicator (SAI), etc. Conventionally, provisioning, or modifying, such parameters in an access point, i.e., if service providers agree to swap a spectrum of frequencies, if access point capacity of the network of the service provider changes, etc. requires manual configuration and/or reconfiguration of equipment at the access point. Further, conventional access point provisioning techniques require manual generation, testing, and/or debugging of firmware/scripts at the access point.

The above-described deficiencies of today's wireless communication networks and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter or delineate the scope of the subject innovations. Its sole purpose is to present some concepts of the disclosed subject matter in a simplified form as a prelude to the more detailed description presented later.

To correct for the above identified deficiencies of today's wireless communication environments and other drawbacks of conventional wireless resource allocation environments, various systems, methods, and apparatus described herein automate wireless access point resource allocation and optimization utilizing location specific wireless access point settings.

For example, a method can include automatically determining, based on a boundary of a geographical region, one or more parameters associated with wireless communications of a wireless access point of at least one wireless access point included in the boundary; and remotely directing the wireless access point, via at least one instruction, to automatically configure equipment of the wireless access point to provide the wireless communications utilizing at least one of the one or more parameters.

In another example, the method can automatically create the boundary of the geographical region based on at least one of: a time zone, a change in a frequency of electromagnetic radiation, a change in a spectrum of frequencies of electromagnetic radiation, a distribution of a service area indicator (SAI) within one or more geographical regions of the geographical regions, an increase in an amount of wireless access points, a decrease in the amount of the wireless access points, a utilization rate of one or more wireless access points, or a wireless access point capacity of a femto gateway coupled to the at least one wireless access point.

In yet another example, a system can include an external data store (EDS) component configured to: automatically select, based on spatial data of at least one polygon including at least one wireless access point, one or more parameters associated with wireless communications of the at least one wireless access point; and an access point provisioning gateway (APPG) component configured to remotely initiate the at least one wireless access point to automatically configure equipment of the at least one wireless access point to service the wireless communications using at least one of the one or more parameters.

In yet another example, a system can include means for automatically selecting, based on spatial data of a polygon, one or more parameters associated with wireless communication via a wireless access point located within the polygon; and means for initiating the wireless access point to automatically configure equipment for servicing the wireless communication utilizing the one or more parameters.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
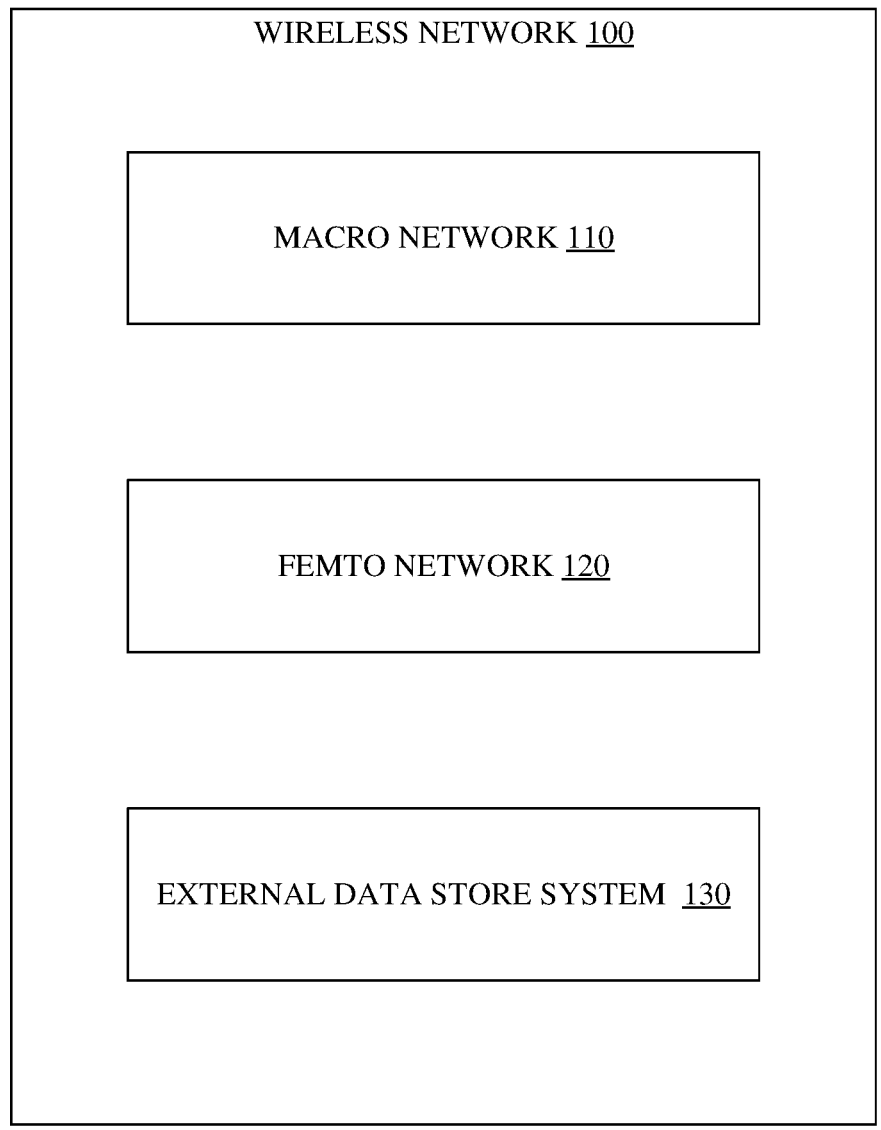
FIG. 1 illustrates a wireless network that includes an external data store (EDS) system for facilitating automated wireless access point resource allocation and optimization, in accordance with an embodiment.

Various non-limiting embodiments of systems, methods, and apparatus presented herein automate wireless access point resource allocation and optimization utilizing location specific wireless access point settings.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics can be combined in any suitable manner in one or more embodiments.

As utilized herein, terms "component", "system", "platform", "node", "layer", "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, a distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via EDS component 610 (described below) to automatically select, based on spatial data of at least one polygon including at least one wireless access point, one or more parameters associated with wireless communications of the at least one wireless access point. In another example, the artificial intelligence system can be used, via APPG component 610 (described below) to remotely initiate the at least one wireless access point to automatically configure equipment of the at least one wireless access point to service the wireless communications using at least one of the one or more parameters.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, at least one of: a magnetic storage device, e.g., hard disk; a floppy disk; a magnetic strip; an optical disk (e.g., compact disk (CD), digital video disc (DVD), Blu-ray Disc™ (BD)); a smart card; a flash memory device (e.g., card, stick, key drive); and/or a virtual device that emulates a storage device and/or any of the above computer-readable media.

Moreover, terms like "user equipment" (UE), "mobile station", "mobile subscriber station", "access terminal", "terminal", "handset", "appliance", "machine", "wireless communication device", "cellular phone" and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence (see above), e.g., a capacity to make inference based on complex mathematical formalisms, that can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), etc.

Additionally, one or more embodiments described herein can include legacy telecommunication technologies, e.g., plain old telephone service (POTS). Further, selections of a radio technology can include second generation (2G), third generation (3G), fourth generation (4G), fifth generation (5G), etc. evolution of the radio technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed within one or more elements of a network infrastructure, e.g., radio network controller.

The subject disclosure relates to systems, methods, and apparatus that automate wireless access point resource allocation and optimization in a wireless-based communication infrastructure. Such an infrastructure can include femtocells, which are wireless access points that can interface with a wired or wireless broadband network. Femtocells usually use a licensed radio spectrum operated and controlled by a wireless service provider, and are generally deployed to improve indoor wireless coverage. Moreover, femtocells can reduce loading of over-the-air radio resources, e.g., radio frequency channels, etc. operated by the wireless service provider. User equipment (UE), e.g., a mobile wireless device, cell phone, wireless communications device, etc. can be operated by a subscriber of the wireless service provider within a femto coverage area, or femto network including one or more femtocells.

The UE can communicate with a core network, e.g., wired broadband network, via a femto access point (AP), or femtocell, utilizing a femto based wireless protocol. The femto AP employs a backhaul network, e.g., broadband wired network backbone, to route packet communication, e.g., voice traffic, data traffic, data, etc., to the core network. Typically, the UE can register with the femto AP, and communication, such as voice and/or data traffic, can be routed to the subscriber via the femto AP utilizing the femto based wireless protocol. Further, the UE can communicate with the core network via a macro network that includes at least one base station generally intended to serve mobile wireless devices in outdoor locations. Each base station can employ a backhaul network, e.g., broadband wired or wireless network backbone, to route packet communication, e.g., voice traffic, data traffic, data, etc. to the core network.

Now referring to FIG. 1, a wireless network 100 including an external data store (EDS) system 130 for automating wireless access point resource allocation and optimization utilizing location specific wireless access point settings is illustrated, in accordance with an embodiment. Wireless network 100 can further include macro network 110 and femto network 120. Macro network 110 can include at least one base station (not shown) that serves mobile wireless devices (not shown) in outdoor locations via a macro cell. The term "macro cell" generally refers to a coverage area, or geographical area, having a radius of at least one kilometer. The terms "microcell," "picocell," and "femtocell" generally refer to progressively smaller sized coverage areas.

While aspects and/or features of the subject disclosure are illustrated in relation to macro cells, macro cell access points, femtocells, and femtocell access points, such aspects and/or features are also applicable to, and can be implemented in: a microcell, or microcell access point; a picocell, or picocell access point; a Wi-Fi™ access point; a WiMAX™ access point; a Bluetooth™ access point; other wireless-based access points; or the like. Further, macro network 110 can include a core network (not shown) comprising one or more cellular technologies, e.g., 3GPP UMTS, GSM, etc. Each base station, or access point, of macro network 110 can communicate with the core network via a wired backbone link (not shown), e.g., optical fiber, twisted-pair, coaxial cable, etc.

Femto network 120 can include femtocells (not shown), which are wireless access points that can interface with macro network 110. It should be appreciated that although femto network 120 is illustrated in FIG. 1 as an entity distinct from macro network 110, femto network 120 can be located/included within and/or across one or more locations, components, e.g., hardware, software, etc., of macro network 110. For example, one or more femtocells of femto network 120 can be located within a macro cell served by a base station of macro network 110.

A mobile wireless device served by macro network 110, and operated by a subscriber within a femto coverage area of femto network 120, can communicate with the core network of macro network 110 via one or more femto access points (APs) (not shown). Typically, the mobile wireless device can register with a femto AP and communication, e.g., voice or data traffic, can be routed to the subscriber through the femto AP utilizing a femto based wireless protocol, e.g., based on a licensed or unlicensed radio spectrum. The femto AP can employ a backhaul network (not shown), e.g., broadband wired or wireless network backbone, to route packet communication, e.g., voice traffic, data traffic, data, etc. to the core network of macro network 110.

As described above, conventional techniques cannot efficiently configure, reconfigure, and/or modify equipment of an access point based on changed communication parameters since such techniques require manual creation, execution, and/or debug of firmware, scripts, etc. at the access point ("on-site"). Compared to conventional techniques, EDS system 130 can effectively provision an access point, e.g., within macro network 110 and/or femto network 120, by automatically selecting device settings of the wireless access point based on a location of the wireless access point. Further, EDS system 130 can effectively provision the access point by initiating automatic configuration of equipment of the wireless access point according to at least part of the device settings.

It should be appreciated that although EDS system 130 is illustrated in FIG. 1 as an entity distinct from macro network 110 and femto network 120, EDS system 130 can be located/included within and/or across one or more components, e.g., hardware, software, etc. of wireless network 100, e.g., within or among hardware and/or software of components of macro network 110 and/or femto network 120.

Figure 2:
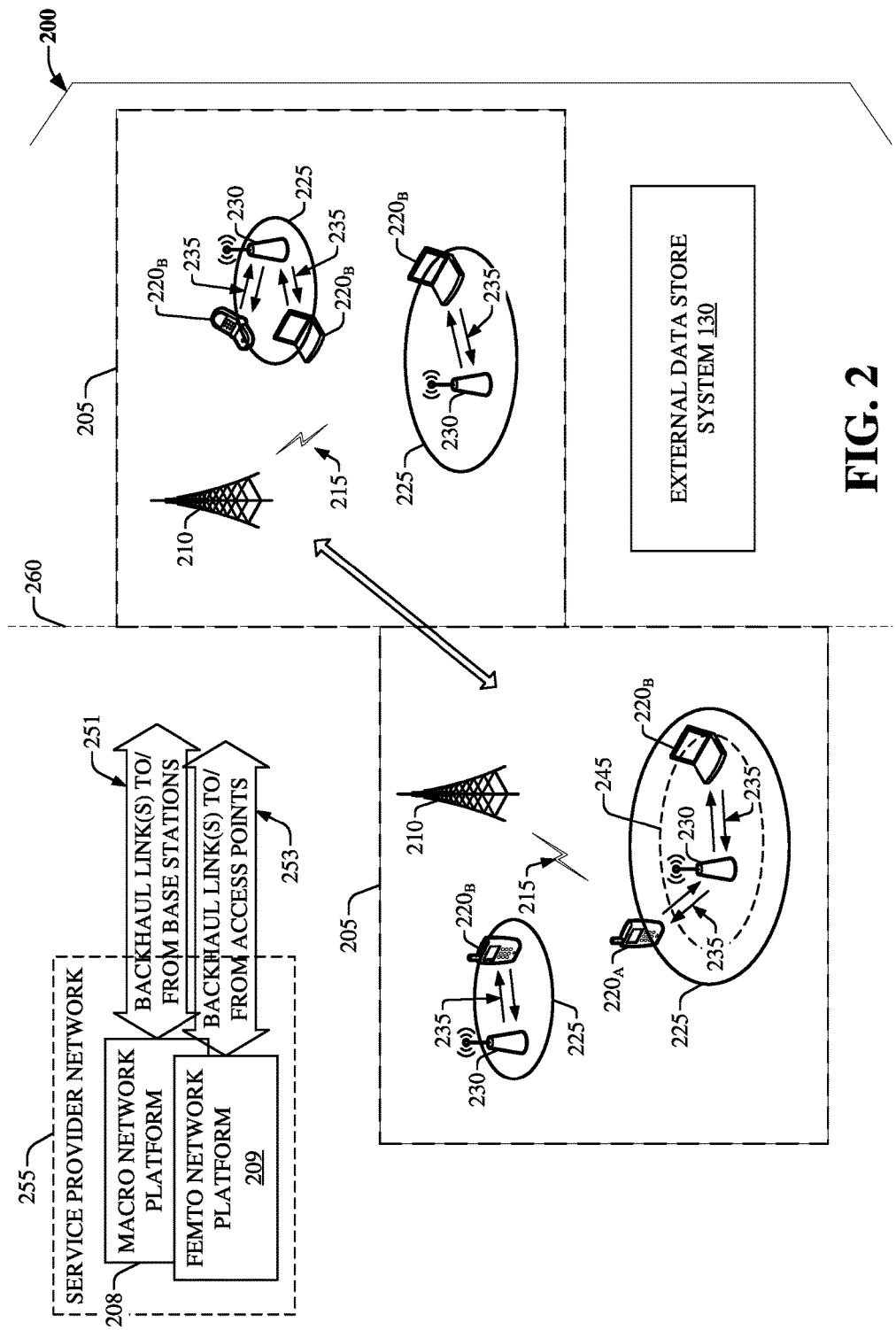
FIG. 2 illustrates a wireless environment including an EDS system for effectively provisioning parameters in a wireless access point, in accordance with an embodiment.

FIG. 2 illustrates a wireless environment 200 that includes an EDS system 130 for effectively provisioning parameters in a wireless access point, in accordance with an embodiment. Each macro cell 205 represents a "macro" cell coverage area, or sector, served by a base station 210—macro cells 205 bordering time zone 260. It should be appreciated that although macro cells 205 are illustrated as parallelograms, macro cells 205 can adopt other geometries, or polygons, generally dictated by spatial data, deployment, or topography of the macro cell coverage area (or covered geographic area), e.g., metropolitan statistical area (MSA), rural statistical area (RSA), etc. Macro cell coverage is generally intended to serve mobile wireless devices, e.g., mobile wireless device $220_A$, mobile wireless device $220_B$, etc. in outdoor locations. An over-the-air wireless link 215 provides the macro coverage, and includes a downlink (DL) and an uplink (UL) (both not shown) that can utilize a predetermined band of radio frequency (RF) spectrum associated with, e.g., GSM, 3GPP UMTS. Accordingly, mobile wireless device $220_A$ can be a GSM and/or 3GPP UMTS mobile phone, while $220_B$ can be a remote computing device with GSM and/or 3GPP UMTS capabilities.

Base station 210—including associated electronics, circuitry and/or components—and wireless link 215 form a radio network, e.g., base station subsystem (BSS) associated with a GSM wireless network, or radio access network (RAN) associated with a UMTS wireless network. In addition, base station 210 communicates with macro network platform 208 via backhaul link(s) 251. Macro network platform 208 represents a core network comprising one or more cellular wireless technologies, e.g., 3GPP UMTS, GSM, etc. In one aspect, macro network platform 208 controls a set of base stations 210 that serve either respective cells or a number of sectors within such cells. Macro network platform 208 can also communicate with other base stations (not shown) that serve other cells (not shown). Backhaul link(s) 251 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 251 can link disparate base stations 210 based on macro network platform 208.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 210 is typically connected to the backhaul network, e.g., service provider network 255, via a broadband modem (not shown) and backhaul link(s) 251. Through backhaul link(s) 251, base station 210 can handle substantially any quality of service (QoS) for heterogeneous packetized traffic, e.g., various multiple packet flows.

Base station 210 can integrate into an existing network, e.g., GSM network, 3GPP network, etc. via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

Femtocell 225 typically covers an area (or coverage area) that includes confined area 245, which is determined, at least in part, by transmission power allocated to femto AP 230, path loss, shadowing, etc. While confined area 245 and the coverage area typically coincide, it should be appreciated that in certain deployment scenarios, the coverage area can include an outdoor portion, e.g., parking lot, patio deck, recreation area; while confined area 245 can be enclosed by a building, e.g., home, retail store, business. The coverage area typically is spanned by a coverage radius ranging from 20 to 100 meters. Confined area 245 is generally associated with an indoor space and/or building, such as a residential space, e.g., house, condominium, apartment complex, etc.; business space, e.g., retail store, mall, etc.; or public space, e.g., library, hospital, etc. Such spaces can span about 5000 sq. ft.

Femto AP 230 typically serves a few (e.g., 2-5) wireless devices, e.g., UE $220_A$ and subscriber station $220_B$, within coverage areas associated with respective femtocells 225— each wireless device coupled to femto AP 230 via a wireless link 235 that comprises a downlink and an uplink (depicted as arrows in FIG. 2). A femto network platform 209 can control such service(s), in addition to registering at least one femto AP 230, provisioning parameters in the at least one femto AP 230, managing macro-to-femto handover, and managing femto-to-macro handover. Control or management is facilitated by access point backhaul link(s) 253 that connect deployed femto APs 230 with femto network platform 209. Access point backhaul link(s) 253 are substantially similar to backhaul link(s) 251.

Femto network platform 209 also includes components, e.g., nodes, gateways, interfaces, that facilitate packet-switched (PS), e.g., internet protocol (IP), traffic and signal generation for networked telecommunication. It should be appreciated that femto network platform 209 can integrate seamlessly with substantially any PS-based and/or circuit switched (CS)-based network (such as macro network platform 208). Thus, operation with a wireless device such as $220_A$ is substantially seamless when handover from femto-to-macro, or vice versa, occurs.

As an example, femto AP 230 can integrate into an existing network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

Substantially all voice or data active sessions associated with subscribers within femtocell coverage, e.g., coverage area associated with femtocell 225, are terminated once the femto AP 230 is shut down; however, for data sessions, data can be recovered at least in part through a buffer, e.g., memory, associated with a femto gateway of femto network platform 209. Coverage of a suspended (or hotlined) subscriber station, or an associated account, can be blocked, e.g., over an associated air-interface. If a suspended or hotlined customer who owns a femto AP 230 is in Hotline/Suspend status, there is no substantive impact to customers covered through the subject femto AP 230. In another aspect, femto AP 230 can exploit high-speed downlink packet access via an interface with macro network platform 208, or through femto network platform 209, in order to accomplish substantive bitrates.

It should be appreciated that although EDS system 130 is illustrated by FIG. 2 as an entity distinct from, e.g., femto network platform 209, base stations 210, femtocells 225, femto APs 230, service provider network 225, etc. aspects and/or features of EDS system 130 can be located/included within and/or across one or more components, e.g., hardware, software, etc., of wireless network 200. For example, in one embodiment, EDS system 130 can be located within any component(s) of a GSM and/or UMTS core network, e.g. service provider network 255. In another embodiment, EDS system 130 can be located and/or integrated in/with hardware and/or software of femto network platform 209, base station 210, femtocells 225, femto APs 230, service provider network 225, etc. Moreover, it should be appreciated that features and advantages of the subject innovation can be implemented in microcells, picocells, or the like, wherein base station 210 can be embodied in an access point.

Conventional techniques cannot efficiently configure, reconfigure, and/or modify equipment of an access point because such techniques require manual configuration, testing, and/or debug of the equipment, i.e., utilizing scripts, at the access point. Compared to conventional techniques, EDS system 130 can automate wireless access point, e.g., base station 210, femto AP 203, etc. resource allocation by automatically selecting device setting(s) of such wireless access points based on a location of the wireless access points. Further, EDS system 130 can direct, instruct, etc. the wireless access points to automatically provision equipment of the wireless access points according to the device setting(s).

Figure 3:
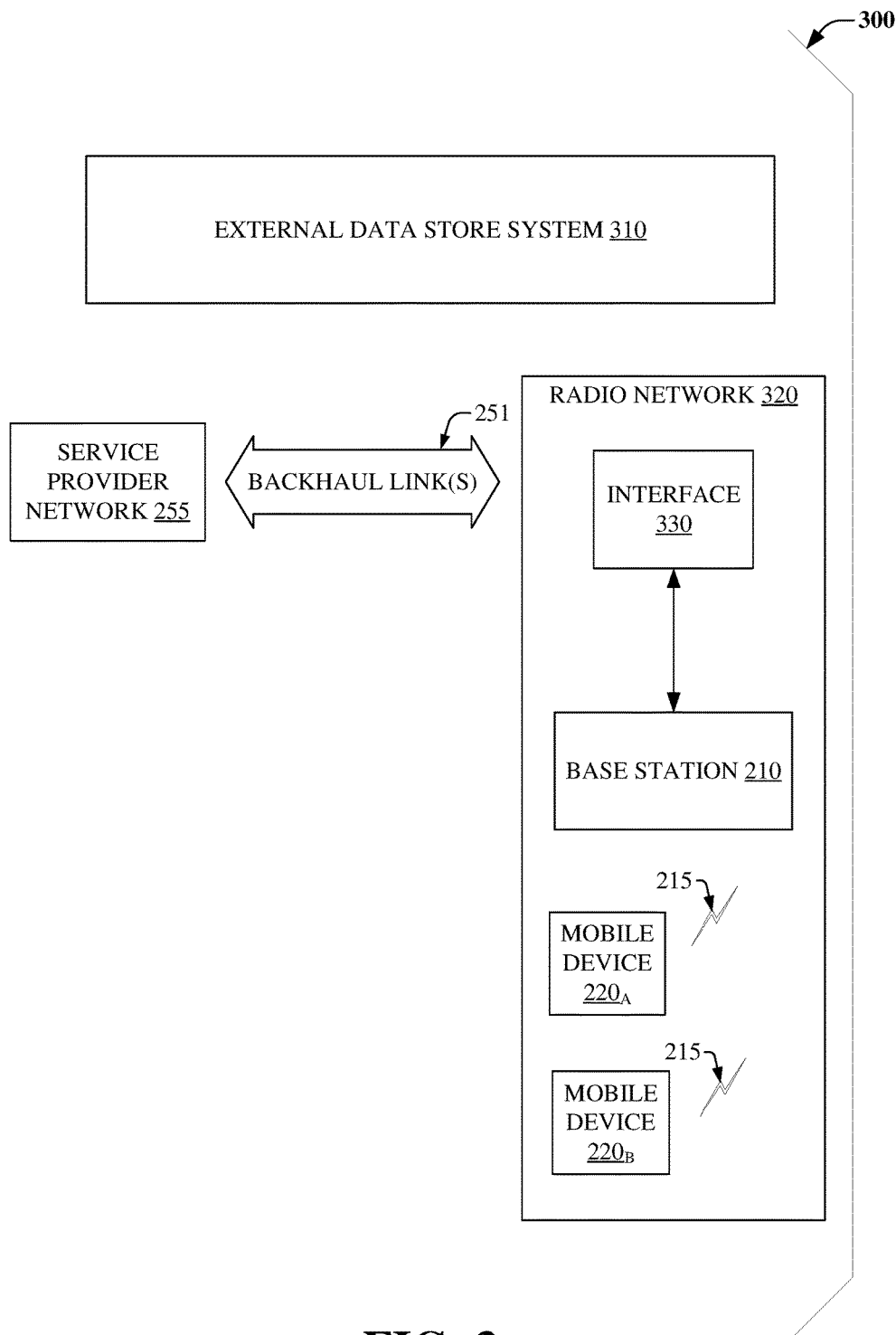
FIG. 3 illustrates another wireless environment including an EDS system for effectively provisioning parameters in a wireless access point, in accordance with an embodiment.

FIG. 3 illustrates another wireless environment (300) that effectively provisions a wireless access point, in accordance with an embodiment. Wireless environment 300 can comprise one or more base stations 210, for example: coupled to a BSC forming a base station system (BSS) (see, e.g., FIG. 4); coupled to an RNC forming a UMTS Terrestrial Radio Access Network (UTRAN) (see, e.g., FIG. 5). Radio network 320 can couple to a core network, e.g., service provider network 255, via one or more backhaul links 251 (see above) to facilitate wireless communication and data transfer to one or more wireless devices, e.g., mobile wireless device $220_A$/mobile wireless device $220_B$, in accordance with the disclosed subject matter. Radio network 320 can comprise any wireless technology, e.g., GSM, UMTS, etc.

Wireless environment 300 includes EDS system 310 that can automate provisioning parameters in a wireless access point, e.g., base station 210, femto AP 203, etc. based on a boundary, or spatial data, of a geographical region, or polygon, including the wireless access point. Further, EDS system 310 can be used via any wireless technology implementing wireless access points(s), e.g., GSM, 3GPP UMTS, etc. Moreover, it should be appreciated that although EDS system 310 is illustrated by FIG. 3 as an entity distinct from, e.g., radio network 320, service provider network 255, etc. aspects and/or features of EDS system 310 can be located/included within and/or across one or more components, e.g., hardware, software, etc., of wireless environment 300, e.g., within or among hardware and/or software of components of radio network 320 and/or service provider network 255.

Further, one or more aspects of wireless environment 300, and the wireless environments, networks, systems, apparatus, and processes explained herein, can constitute machine-executable instructions embodied within machine(s), e.g., embodied in one or more computer readable mediums (or media) associated with one or more machines. Such instructions, when executed by the one or more machines, e.g., computer(s), computing device(s), virtual machines(s), etc. can cause the machine(s) to perform operations described.

Additionally, the systems and processes can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Conventional wireless access point techniques require manual configuration of access point equipment on-site (at the access point). Compared to such techniques, various systems, methods, and apparatus described herein facilitate effective wireless access point resource allocation, e.g., within wireless environment 300, by (1) automatically selecting access point communication parameter(s) based on boundary and/or spatial data information of a coverage area, e.g., macro cell 205, a confined area, e.g., 245, etc. including the access point, e.g., within radio network 320; and (2) initiating the wireless access point to automatically configure equipment for servicing a wireless communication utilizing the access point communication parameter(s).

Moreover, the various systems, methods, and apparatus described herein facilitate effective wireless access point resource allocation by automatically creating the boundary and/or spatial data information of the coverage area, e.g., within wireless environment 300, based on at least one of: a time zone, a change in a frequency of electromagnetic radiation, a change in a spectrum of frequencies of electromagnetic radiation, a distribution of a service area indicator (SAI) within one or more geographical regions of the geographical regions, an increase in an amount of wireless access points, a decrease in the amount of the wireless access points, a utilization rate of one or more wireless access points, or a wireless access point capacity of a femto gateway coupled to the at least one wireless access point.

Figure 4:
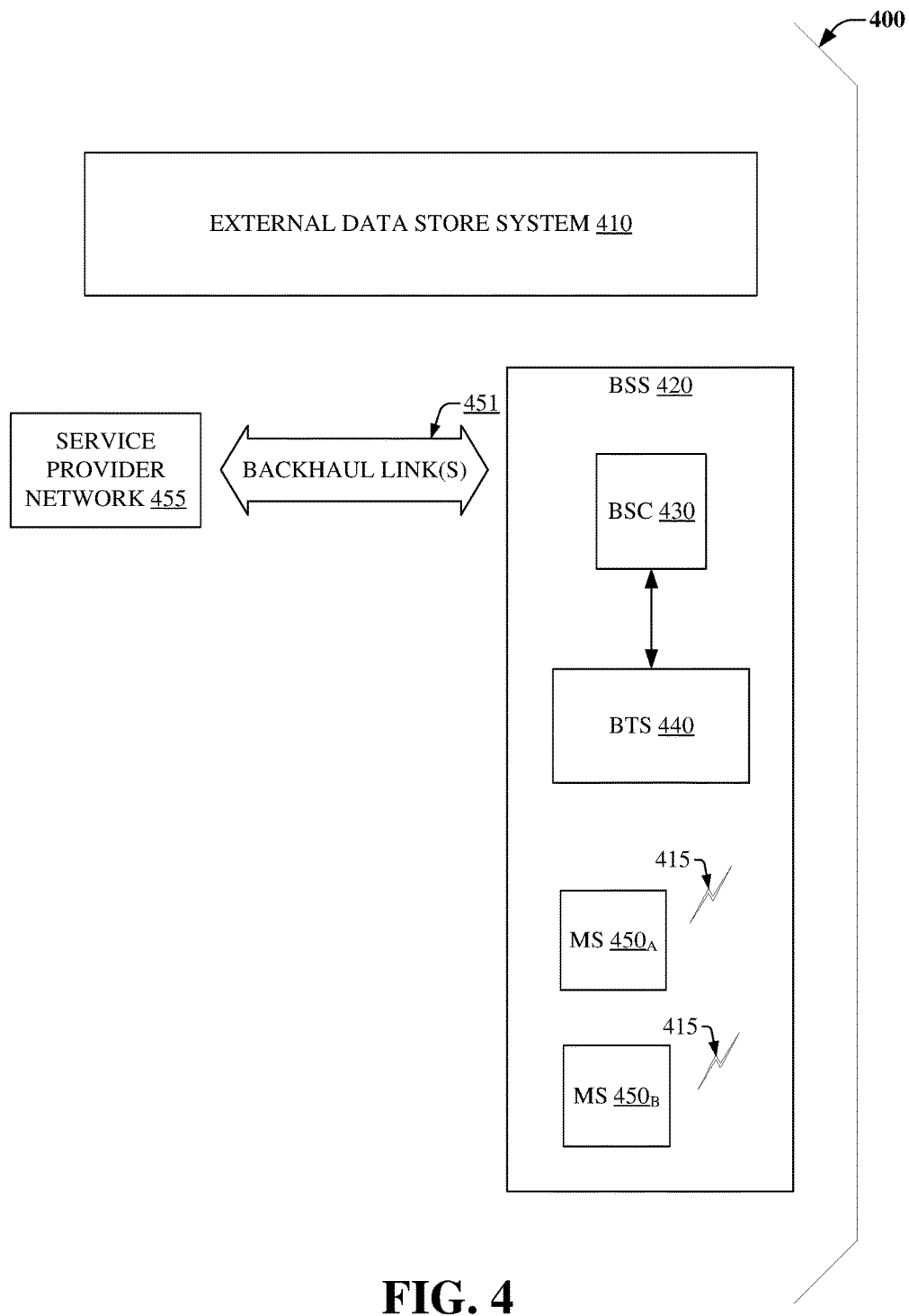
FIG. 4 illustrates a Global System for Mobile Communication (GSM) wireless environment that facilitates effective provisioning of parameters in a wireless access point, in accordance with an embodiment.

FIG. 4 illustrates a GSM wireless environment that facilitates effective provisioning of parameters in a wireless access point, in accordance with an embodiment. GSM wireless environment 400 can include at least one base transceiver station (BTS) 440 coupled to base station controller (BSC) 430 to form a base station subsystem (BSS) 420 of a GSM network. BSS 420 can be coupled to a core network, e.g., service provider network 455, via one or more backhaul links 451 (see above) to facilitate wireless communication and data transfer to one or more wireless devices, e.g., mobile station 450A/mobile station 450B, in accordance with the disclosed subject matter.

GSM wireless environment 400 includes EDS system 410, which can facilitate effective wireless access point resource allocation within the GSM network by automatically selecting access point communication parameter(s) and initiating wireless access point(s) to automatically configure equipment for servicing wireless communication(s) utilizing the access point communication parameter(s). (See, e.g., EDS system 310 above). It should be appreciated that although EDS system 410 is illustrated in FIG. 4 as an entity distinct from other entities and/or components of GSM wireless environment 400, one or more aspects of EDS system 410 can be located/included within one or more components, e.g., hardware, software, etc. (e.g., BSS 420, femto AP (not shown)), of GSM wireless environment 400.

Figure 5:
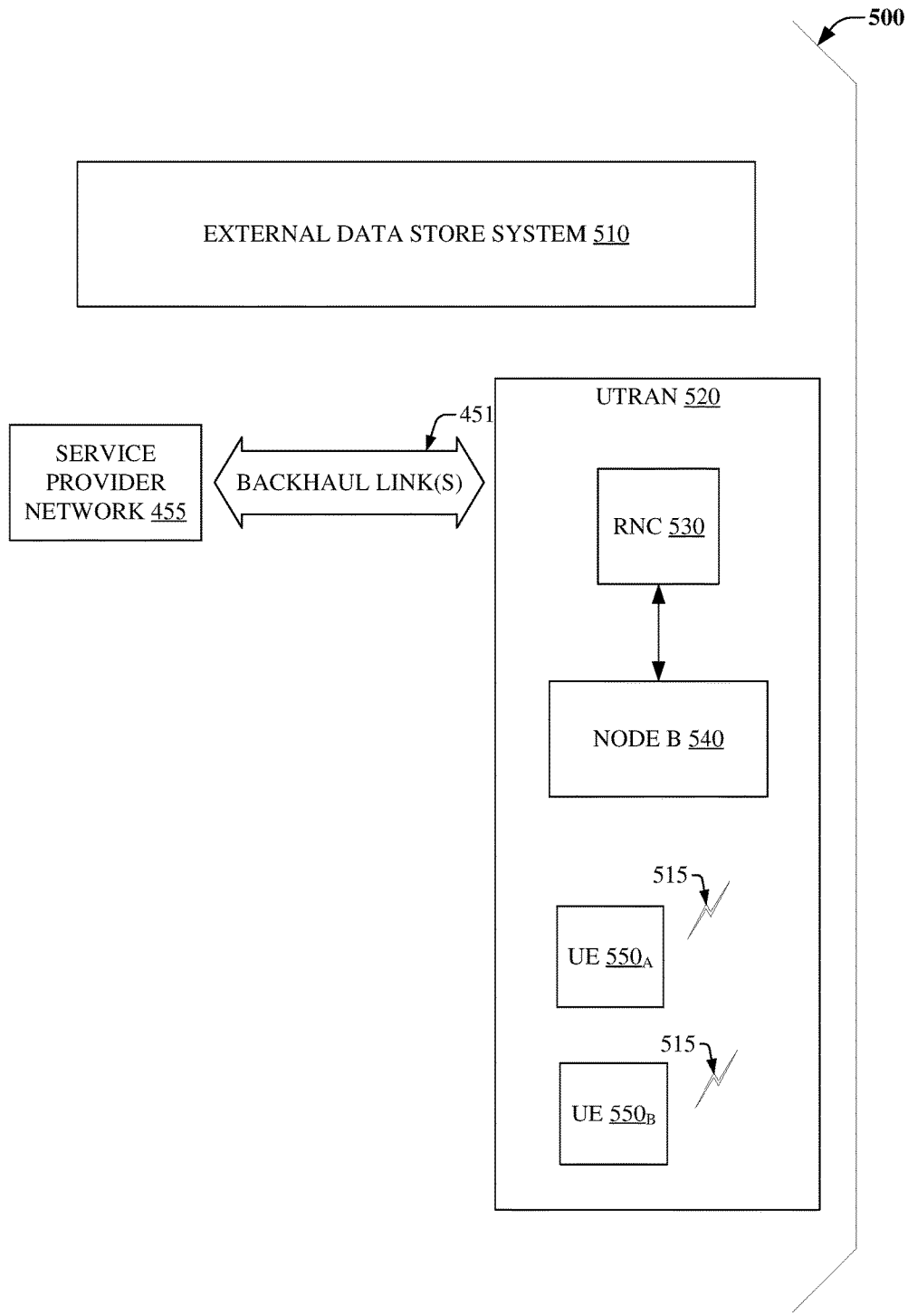
FIG. 5 illustrates a Universal Mobile Telecommunication System (UMTS) wireless environment that facilitates effective provisioning of parameters in a wireless access point, in accordance with an embodiment.

FIG. 5 illustrates a UMTS wireless environment 500 that facilitates effective provisioning of parameters in a wireless access point, in accordance with an embodiment. UMTS wireless environment 500 can include at least one node B 540 coupled to a radio network controller 530 to form a UMTS Terrestrial Radio Access Network (UTRAN) 520 of a UMTS network. UTRAN 520 can couple to a core network, e.g., service provider network 555, via one or more backhaul links 551 (see above) to facilitate wireless communication and data transfer to one or more wireless devices, e.g., user equipment $550_A$/user equipment $550_B$, in accordance with the disclosed subject matter. UMTS wireless environment 500 includes EDS system 510 that can facilitate effective wireless access point, e.g., node B 540, femto AP (not shown), etc. resource allocation within the UMTS network, e.g., a 3GPP network, by automatically selecting access point communication parameters and initiating wireless access point(s) to automatically configure equipment for servicing wireless communication(s) utilizing the access point communication parameter(s)

It should be appreciated that although EDS system 510 is illustrated in FIG. 5 as an entity distinct from other entities and/or components of UMTS wireless environment 500, one or more aspects of EDS system 510 can be located/included within one or more components, e.g., hardware, software, etc. (e.g., UTRAN 520, femto AP (not shown)) of UMTS wireless environment 500, e.g., a 3GPP network.

Figure 6:
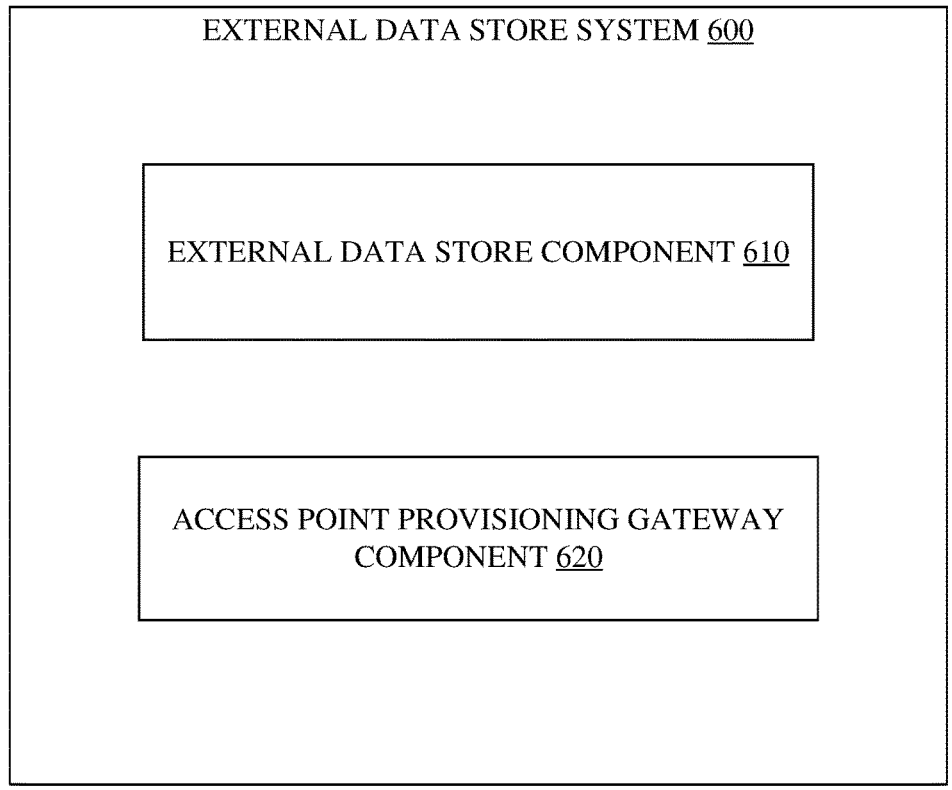
FIG. 6 illustrates an EDS system that provides for automated wireless access point resource allocation and optimization in a wireless-based communication infrastructure, in accordance with an embodiment.

FIG. 6 illustrates an EDS system 600 that provides for automated wireless access point resource allocation and optimization in a wireless-based communication infrastructure, in accordance with an embodiment. EDS system 600 can include an EDS component 610 and an access point provisioning gateway (APPG) component 620. EDS component 610 can be configured to automatically select, based on spatial data of at least one polygon including at least one wireless access point, one or more parameters associated with wireless communications of the at least one wireless access point. In an aspect, the spatial data can include boundary information (or a boundary) of a geographical region (or the at least one polygon) including the at least one wireless access point, e.g., base station 210, femto AP 230, etc. For example, the spatial data can be associated with a geographical boundary of a county. In another example, the spatial data can be associated with a border of a time zone.

In another aspect, the one or more parameters can include a frequency (or a communication channel). The communication channel can be associated with a control channel and/or a broadcast channel of an access point, e.g., base station, femtocell, etc. and used by a mobile wireless device to monitor and/or communicate with the access point, e.g., for servicing an incoming/outgoing call an the active mode. Further, the one or more parameters can include a scrambling code, which can be used for scrambling transmissions from the access point, e.g., for scrambling Primary Common Control Physical Channel (P-CCPCH) transmissions from node B 540 of UMTS wireless environment 500. A mobile wireless device can perform a reselection procedure between phone calls, e.g., during an idle mode, to transition between base stations and/or femtocells, e.g., based on received signal quality, utilizing the communication channel and/or the scrambling code.

Further more, the one or more parameters can include a location area code (LAC). Each wireless access point within a network, e.g., a UMTS network, is assigned a LAC, which the wireless access point broadcasts to a UE; the UE can use the LAC to determine whether it has moved into a coverage area served by a new access point, at which point the UE can send a location update request message to an associated core network.

In addition, the one or more parameters can include a service area indicator (SAI), a range (or spectrum) of frequencies, a range of scrambling codes, or a range of service area indicators (SAIs). The SAI is used to identify an area including one or more access points belonging to the same location area, or service area, and can be used to indicate a location of a UE to the core network. The core network can further use the SAI for charging/billing services and various location based services, e.g., routing of a call to an emergency center.

In another aspect, EDS component 610 can be configured to store, in a database (e.g., see database component 710 below) at least one of the spatial data (or geographical boundary), a Federal Information Processing Standard (FIPS) code, a system identification (SID), a billing identification (BID), a county associated with at least one of the SID or the BID, spectral (or frequency) information associated with the county, or spectral utilization within a polygon of the at least one polygon. FIPS codes are a standardized set of numeric alphabetic codes issued by the National Institute of Standards and Technology (NIST) to insure uniform identification of geographical entities through all federal government agencies. In an aspect, when polygons are split (or divided) (see below), EDS component 610 can apply a FIPS code, e.g., beginning with "999", to the split polygons based on NIST standards.

In one aspect, the SID and/or the BID can be utilized by EDS component 610 for billing purposes, e.g., associating an access point with a particular geographical area, e.g., tied to a particular billing rate. In yet another aspect, the spectral information associated with the county can be included, via EDS component 610, in a spectral string that can be sent to the at least one access point during provisioning of the one or more parameters to enable the at least one access point to scan appropriate frequency bands and blocks to support wireless communications.

In another aspect, EDS component 610 can be configured to automatically select the communication channel based on current spectral utilization of spectral owners, e.g., service providers, associated with the at least one polygon. In yet another aspect, EDS component 610 can be configured to automatically select at least one of the one or more parameters, e.g., the frequency (or communication channel), the scrambling code, the LAC, the SAI, etc. based on the at least one of the spatial data, the FIPS code, the SID, the BID, the county, the spectral information, or the spectral utilization.

Figure 7:
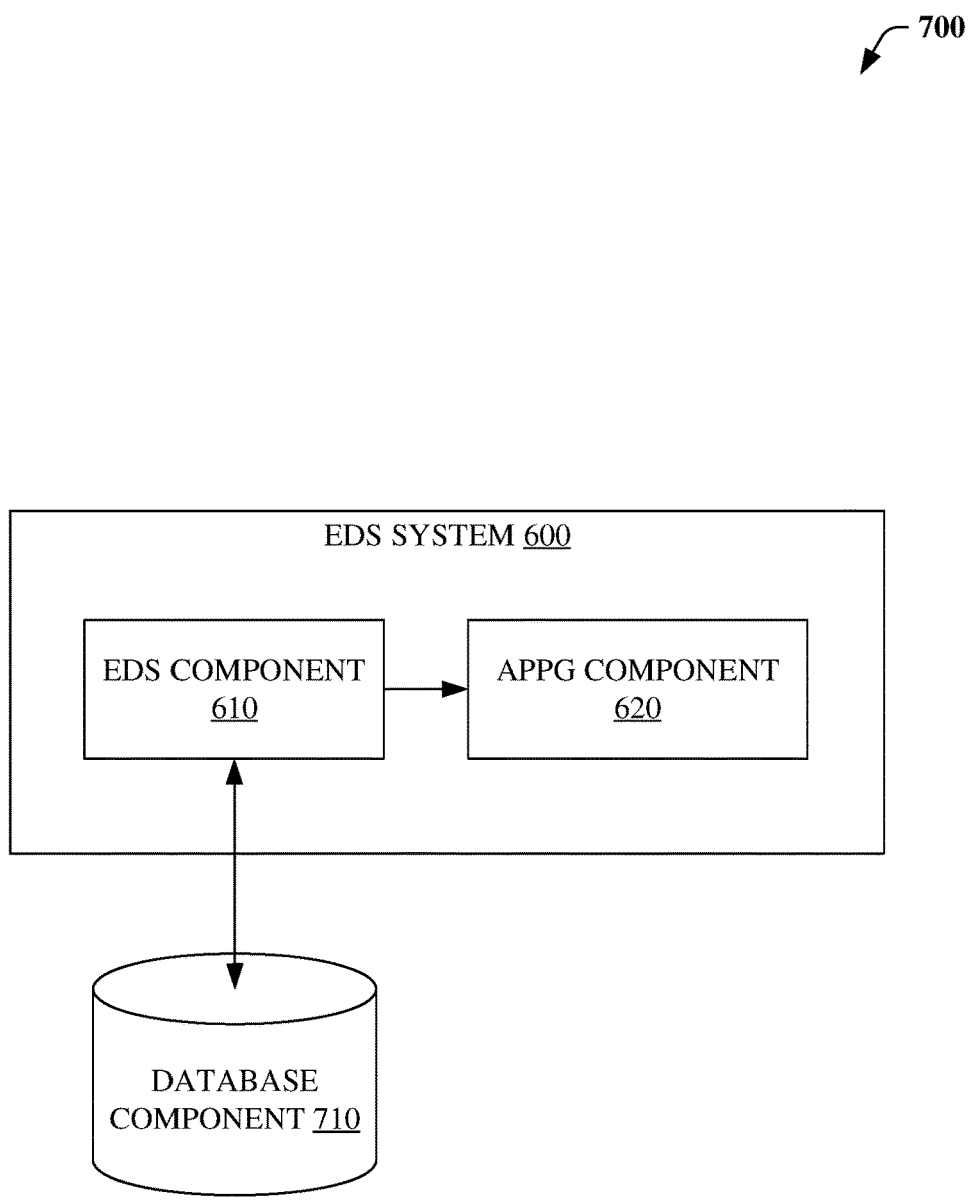
FIG. 7 illustrates another EDS system that provides for automated wireless access point resource allocation and optimization in a wireless-based communication infrastructure, in accordance with an embodiment.

Referring now to FIG. 7, APPG component 620 can be configured to remotely initiate the at least one wireless access point to automatically configure equipment of the at least one wireless access point to service the wireless communications using at least one of the one or more parameters. In the embodiment illustrated by FIG. 7, EDS system 700 can include a database component 710 coupled to EDS component 610, which can retrieve the spatial data, the FIPS code, the SID, the BID, the county, the spectral information, and/or the spectral utilization (see above) stored in database component 710. Further, EDS component 610 can be configured to automatically select at least one of the one or more parameters based on the at least one of the spatial data, the FIPS code, the SID, the BID, the county, the spectral information, or the spectral utilization.

In an aspect, database component 710 can store (via EDS component 610) information of the at least one access point including an access list, or white list, which can establish access authorization, prioritization, and/or revocation of subscriber(s) and/or subscriber station(s) (or access point(s)). For example, the access list can include wireless mobile station numbers approved for coverage via the at least one access point. In another aspect, EDS component 610 can retrieve the information from database component 710 to restore such information at the at least one access point if the information was lost, e.g., via system failure, power failure, etc.

Conventional technology for provisioning parameters in an access point requires manual configuration and/or reconfiguration of equipment at the access point. Further, conventional access point provisioning techniques require manual generation, testing, and/or debugging of firmware/scripts at the access point.

Figure 8:
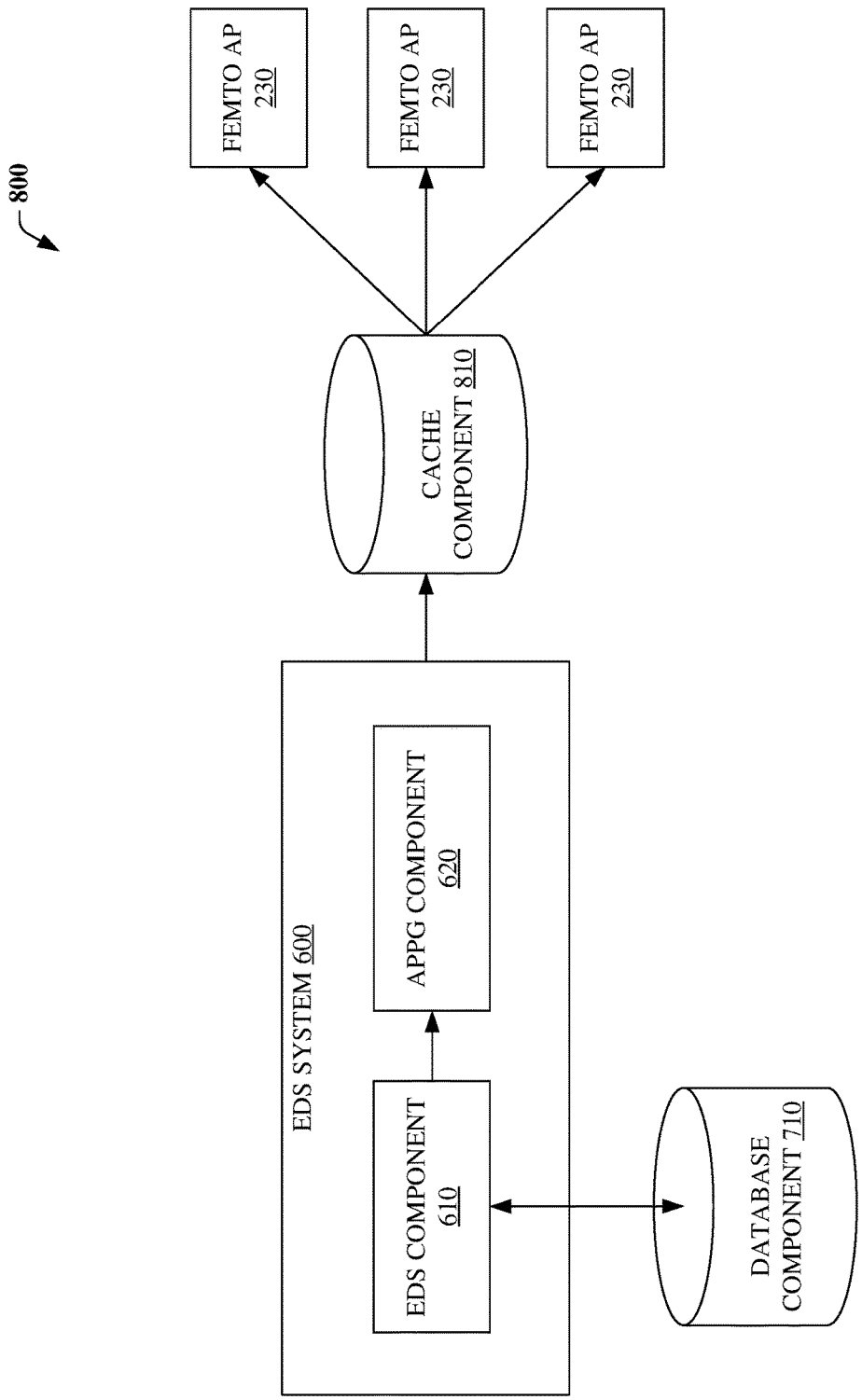
FIG. 8 illustrates yet another EDS system that provides for automated wireless access point resource allocation and optimization in a wireless-based communication infrastructure, in accordance with an embodiment.

In contrast, in an aspect illustrated by FIG. 8, APPG component 620 can be configured to remotely initiate the at least one wireless access point, e.g., femto APs 230, to configure the equipment based on one or more instructions stored in cache component 810. In another aspect, APPG component 620 can be configured to create and store the instructions, e.g., firmware, scripts, etc., in cache component 810. In one aspect, cache component 810 can store the one or more instructions in separate storage buffers, queues, etc. associated with each femto AP 230—the one or more instructions can be transferred from cache component 810 to the at least one wireless access point, which can automatically provision, configure, etc. the one or more parameters in equipment, e.g., wireless transceiver(s), etc. of the at least one wireless access point to service wireless communications via the one or more parameters.

In another aspect, the one or more instructions can initiate, direct, etc. the one or more wireless access points to provision the one or more parameters of the one or more wireless access points during time(s) associated with a minimal effect on wireless communications affecting UE(s), e.g., during the middle of the night. In yet another aspect, the one or more instructions can designate time(s) the one or more wireless access points can download the one or more instructions from APPG component 620, e.g., during time(s) the one or more wireless access points are idle, not busy, experiencing low wireless traffic conditions, etc.

In an aspect, APPG component 620 can automatically determine, e.g., based on analyzing prior (recorded) communication conditions of the one or more wireless access points, e.g., via database component 710, the time(s) the one or more wireless access points would likely be idle, not busy, experiencing low wireless traffic conditions, etc. (e.g., within predetermined threshold(s) associated with wireless traffic congestion, etc. of the one or more wireless access points). Accordingly, in an aspect, APPG component 620 can upload the instruction(s) to the wireless access point(s) during such time(s).

In one aspect, APPG component 620 can be configured to poll, or determine—after a predetermined period of time, e.g., after twenty-four hours from initiating the at least one wireless access point to provision the one or more parameters in the equipment—whether the at least one wireless access point configured the equipment to service the wireless communications using the at least one of the one or more parameters, e.g., to utilize the frequency and/or the scrambling code during the wireless communications.

Further, APPG component 620 can: (1) re-initiate the at least one wireless access point to configure the equipment to service the wireless communications using at least one of the one or more parameters; and/or (2) generate a signal, e.g., sound(s) via speakers, images via display(s), etc. indicating the at least one wireless access point did not configure the equipment. Accordingly, in an aspect, manual intervention can be utilized to provision the one or more parameters in affected wireless access point(s) on-site.

Figure 9:
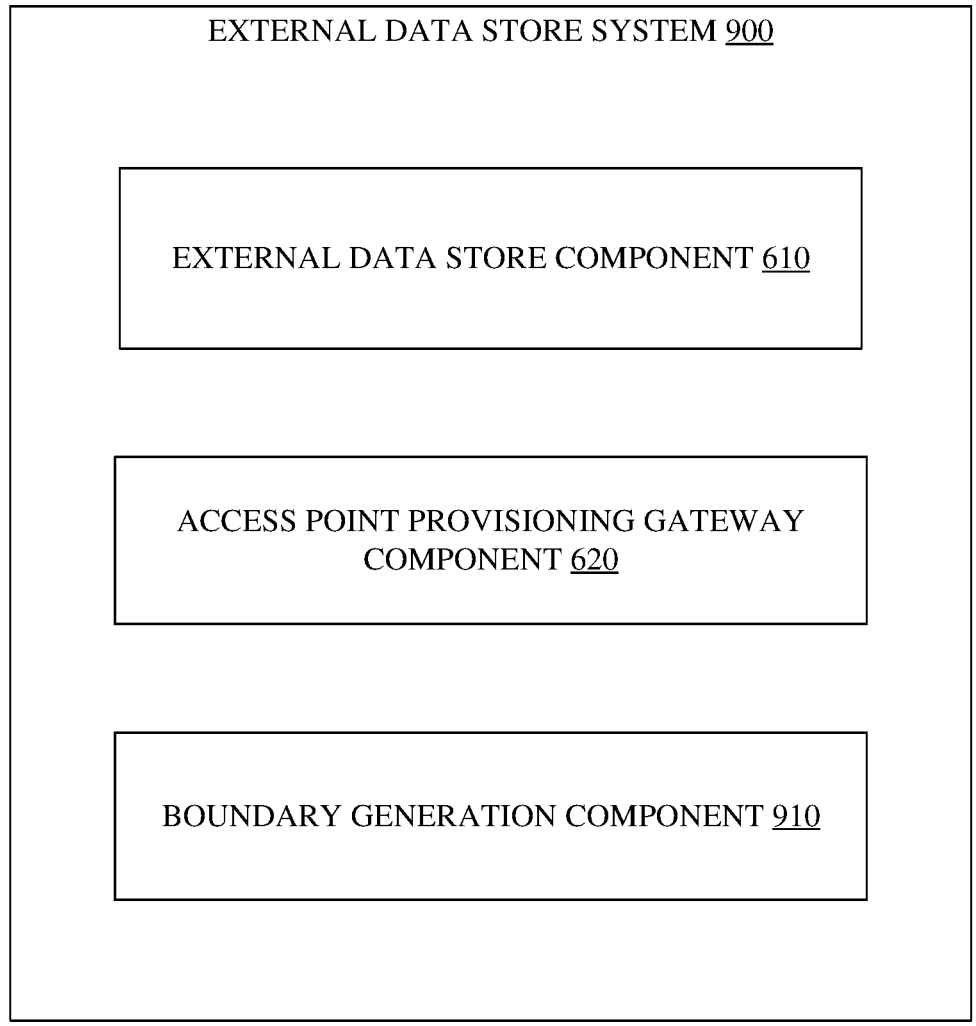
FIG. 9 illustrates an EDS system including a boundary generation component, in accordance with an embodiment.

Now referring to FIG. 9, an EDS system (900) including a boundary generation component 910 is illustrated, in accordance with an embodiment. Boundary generation component 910 can be configured to automatically generate the spatial data (or one or more geographical boundaries) by combining spatial data of two or more polygons (or geographical regions). For example, if a provider acquires new service area(s), e.g., counties, geographical regions, etc. from which the provider can provide wireless services via various wireless access points, boundary generation component 910 can generate the one or more geographical boundaries associated with the new service area(s).

Accordingly, in an aspect, EDS component 610 can associate new/previously used SAI(s) with the one more geographical boundaries. It should be appreciated that non-adjacent, non-contiguous geographical regions can be combined via boundary generation component 910. Further, boundary generation component 910 can be configured to split a polygon/geographical region into at least two polygons/geographical regions, and/or expand a boundary of the polygon, e.g., based on billing practices, service agreements between service providers, a time zone, wireless communication conditions, femto gateway (e.g., base station, femto AP, etc.) expansion, etc.

In another aspect, boundary generation component 910 can be further configured to automatically generate the spatial data, e.g., create, combine, and/or split one or more geographical regions, etc. based on at least one of: a time zone, a change in a frequency of electromagnetic radiation, a change in a spectrum (or range) of frequencies of electromagnetic radiation, a distribution of a service area indicator (SAI) within one or more polygons, an increase in an amount of wireless access points in geographical region(s), a decrease in the amount of the wireless access points in the geographical region(s), a utilization rate of one or more wireless access points, or a wireless access point capacity of a femto gateway (FG) coupled to the at least one wireless access point.

Referring now to FIG. 2, in an aspect, boundary generation component 910 can be configured to create the spatial data, or a boundary of a geographical region, aligned with a border of a time zone, e.g., 260. The time displayed via a UE is based on a transmitted LAC that is transmitted from an access point. As such, LAC(s) that are transmitted from an access point are associated with a time zone where the access point is located—different transmitted LAC(s) are transmitted on different sides of the time zone, so that time is correctly displayed via associated UE(s). Accordingly, in an aspect, boundary generation component 910 can align spatial data with time zone(s) to improve customer experience(s). For example, as illustrated by FIG. 2, boundary generation component 910 created boundaries of macro cells 205 to be aligned with time zone 260.

In one aspect, boundary generation component 910 can be configured to create the boundary of the geographical region aligned with wireless signal quality associated with wireless access point(s), e.g., related to one or more frequencies of electromagnetic radiation, or aligned with changes in (or assignment of) spectrum(s) of frequencies of the electromagnetic radiation, e.g., assigned to a wireless service provider associated with EDS system 900. For example, boundary generation component 910 can create a larger boundary of the geographical region around a wireless access point that is associated with signal quality stronger than that of another, e.g., lower performing, wireless access point. Further, boundary generation component 910 can create the boundary of the geographical region by linking (or combining) geographical regions associated with equivalent, or substantially equivalent, spectrum(s) of frequencies of electromagnetic radiation.

In another aspect, boundary generation component 910 can be configured to create the boundary of the geographical region aligned with a distribution of an SAI within one or more polygons, e.g., based on a billing rate (or BID) associated with the SAI. In another example, boundary generation component 910 can be configured to create the boundary of the geographical region aligned with (1) an increase capacity, e.g., due to an increase in an amount of wireless access points (e.g., base station(s), femto APs, etc.) included in geographical region(s); and/or (2) a decrease in capacity, e.g., due to a decrease in the amount of the wireless access points included in the geographical region(s).

In yet another aspect, boundary generation component 910 can be configured to create the boundary of the geographical region based on a wireless access point capacity of a femto gateway (not shown) coupled to the at least one wireless access point. The femto gateway can aggregate traffic from many, e.g., tens of thousands, of access points, e.g., femto APs, towards a single interface, e.g., MSC, SGSN, etc. of a core network. (See above). When capacity of the femto gateway is reached, e.g., within a predefined threshold, other FG(s), e.g., and associated access points, can be included in a wireless network, e.g., associated with EDS system 900. In an aspect, under a "cap and grow" method of femto gateway expansion within a geographical region, the other FG(s) can be deployed within the geographical region based on load sharing, e.g., access point(s) within the geographical region can be assigned between FG and the other FG(s).

In one aspect, boundary generation component 910 can be configured to automatically split the at least one polygon into at least two polygons (or geographical regions)—the femto gateway servicing one or more access points within a polygon of the at least two polygons, and at least one other femto gateway servicing other access point(s) included in remaining polygons of the at least two polygons. Accordingly, in an aspect, EDS component 610 can associate new/previously used SAI(s) with the at least two polygons.

Figure 10:
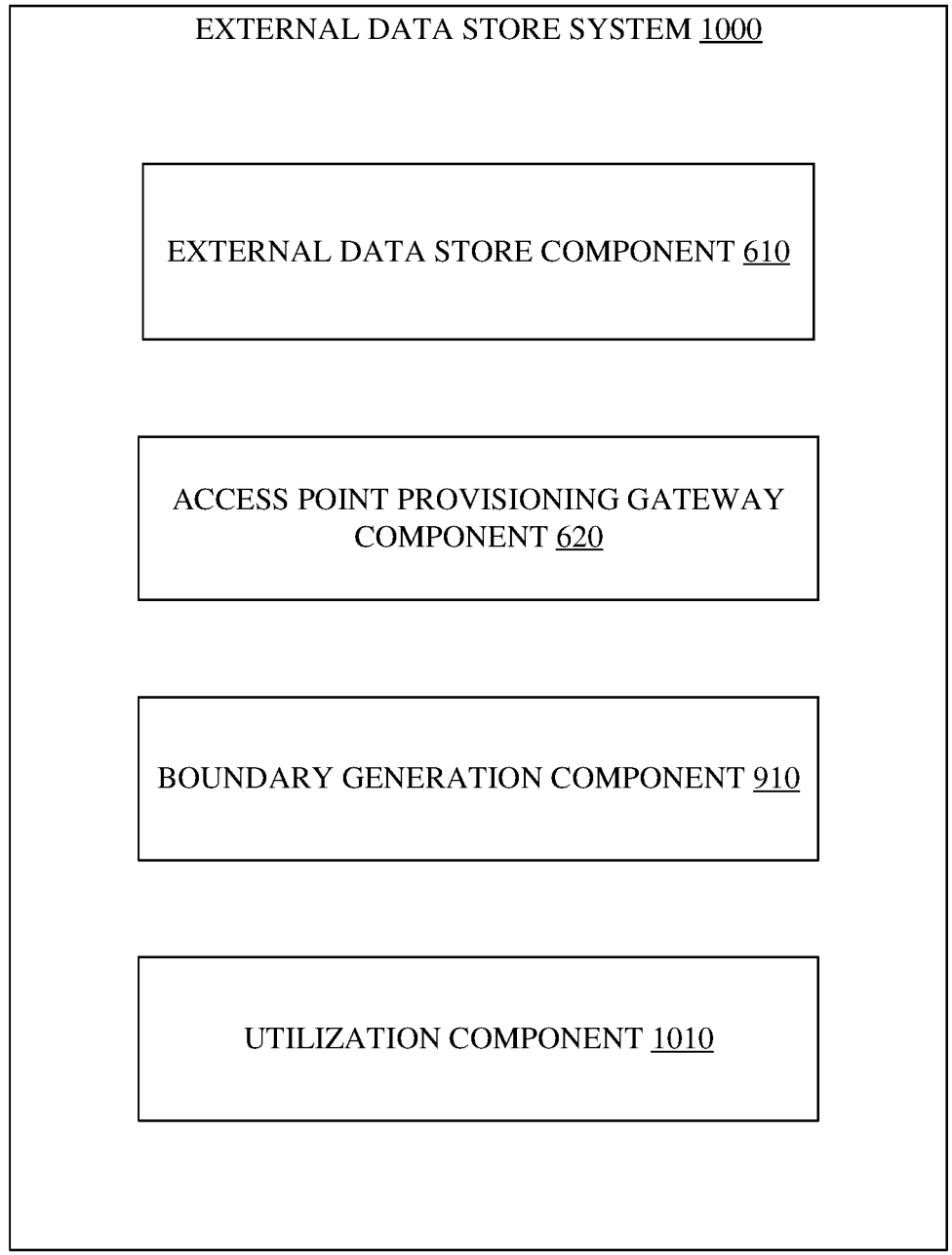
FIG. 10 illustrates an EDS system including a utilization component, in accordance with an embodiment.

FIG. 10 illustrates an EDS system (1000) including a utilization component 1010, in accordance with an embodiment. Utilization component 1010 can be configured to measure a utilization rate of one or more wireless access points included in the at least one polygon (or geographical region(s)). For example, the utilization rate can relate to a distribution of a transmitted LAC assignment between and/or among access points. To facilitate addressing many access points with limited LAC assignments, LAC assignments can be reused, based on limited transmission capability of the access points. For example, if access points assigned the same LAC are geographically separated with sufficient distance so as to reduce/eliminate transmitted LAC collisions, e.g., which can result when the access points send the same LAC to a UE in wireless communication with the access points, then reuse of location area codes (LACs) can be performed. On the other hand, increasing a number of transmitted LAC assignments can reduce transmitted LAC collisions, e.g., within a building including the access points.

Accordingly, in one aspect, EDS component 610 can be configured to automatically select the one or more parameters based on, at least in part, the utilization rate. Referring to the example above, EDS component 610 can be configured to automatically select, or increase, the number of transmitted LAC assignments based on, e.g., a distribution of a transmitted LAC assignment between and/or among access points, e.g., located within a building. In another aspect, boundary generation component 910 can be configured to automatically generate the spatial data based on, at least in part, the utilization rate, e.g., increasing the geographical region based on a distribution of transmitted LAC assignments, e.g., within a building.

FIGS. 11-17 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
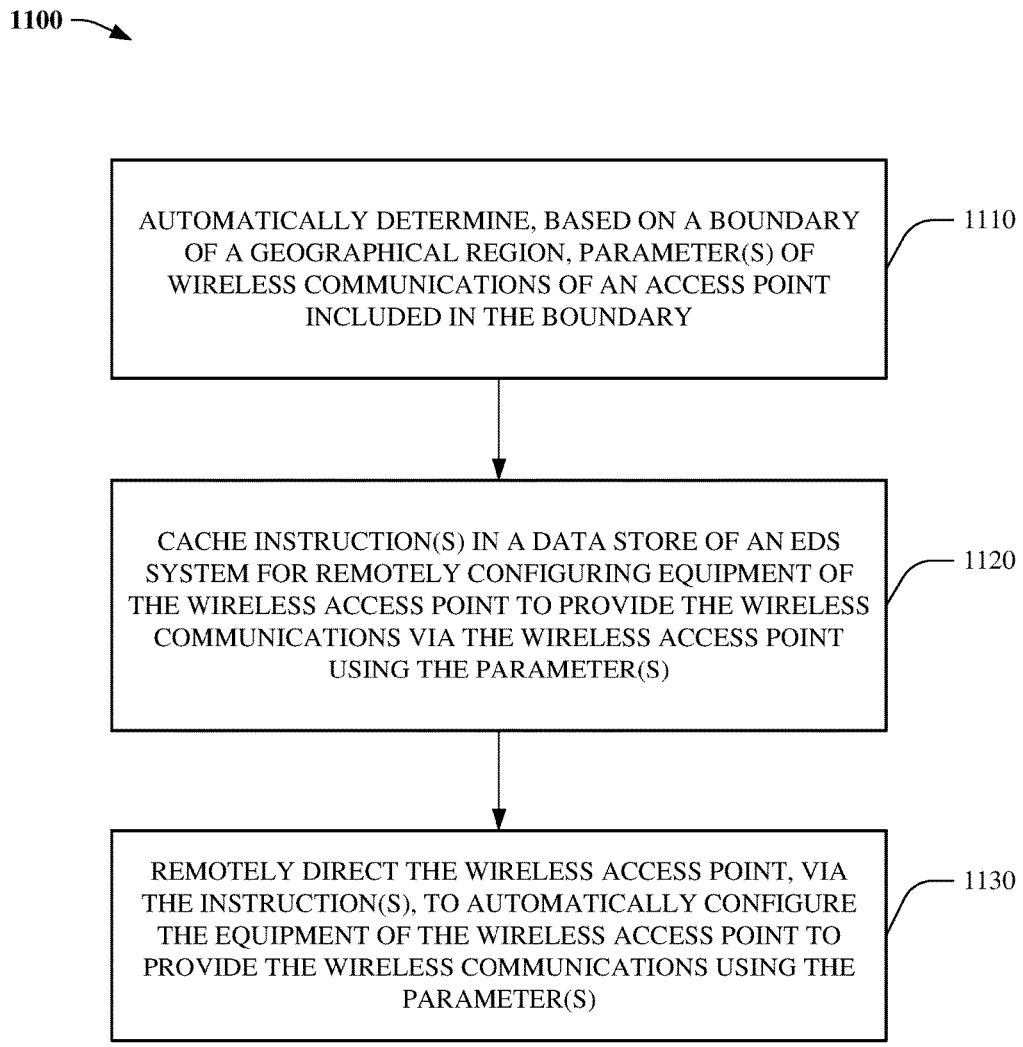
FIGS. 11-18 illustrate various processes associated with one or more EDS systems, in accordance with an embodiment.

Referring now to FIG. 11, a process 1100 associated with an EDS system (e.g., 130, 310, 410, 510, 600-1000, etc.) is illustrated, in accordance with an embodiment. At 1110, process 1100 can automatically determine, based on a boundary of a geographical region, one or more parameters of wireless communications of an access point, e.g., base station 210, femto AP 230, etc. included in the boundary. In an aspect, the one or more parameters can include at least one of: a frequency (or communication channel), a scrambling code, a LAC, an SAI, a range (or spectrum) of frequencies, a range of scrambling codes, or a range of SAIs. In another aspect (not shown), process 1100 can automatically determine the one or more parameters based on electromagnetic spectrum conditions related to at least one of the geographical region, an adjacent geographical region, or another geographical region.

In yet another aspect (not shown), process 1100 can automatically determine the one or more parameters based on at least one database including at least one of: a Federal Information Processing Standard (FIPS) code, a system identification (SID), a billing identification (BID), a county associated with at least one of the SID or the BID, spectral information associated with the county, or spectral utilization within one or more geographical regions of the geographical regions.

At 1120, process 1100 can cache instruction(s) in a data store of an EDS system for remotely configuring equipment of the wireless access point to provide the wireless communications via the wireless access point using the parameters. At 1130, the wireless access point can be remotely directed, via the instruction(s), to automatically configure the equipment of the wireless access point to provide the wireless communications using the parameter(s).

Figure 12:
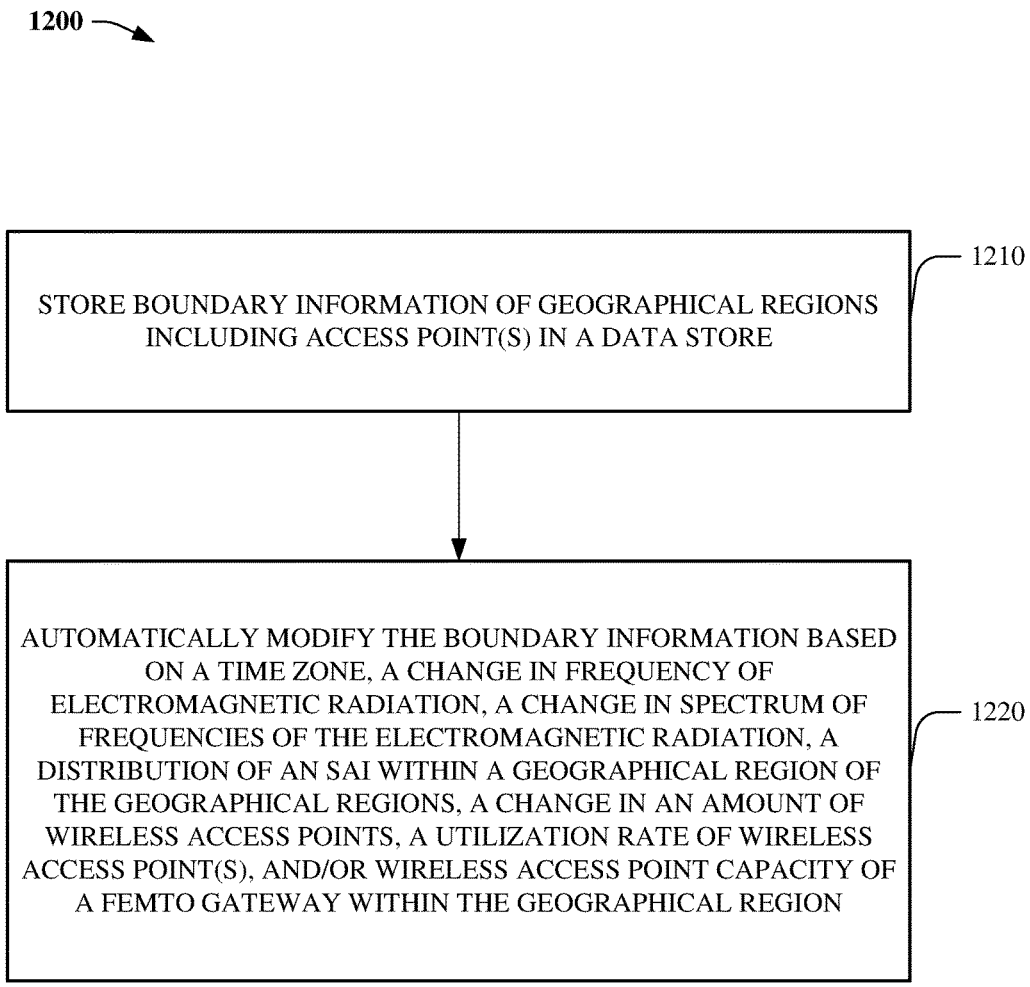

FIG. 12 illustrates a process 1200 associated with storing boundary information in a data store of an EDS system (e.g., 130, 310, 410, 510, 600-1000, etc.), in accordance with an embodiment. At 1210, process 1200 can store boundary information of geographical regions including access point(s) in a data store of the EDS system. At 1220, process 1200 can automatically modify the boundary information based on at least one of a time zone, a change in a frequency of electromagnetic radiation, a change in a spectrum of frequencies of electromagnetic radiation, a distribution of a service area indicator (SAI) within one or more geographical regions of the geographical regions, an increase in an amount of wireless access points, a decrease in the amount of the wireless access points, a utilization rate of one or more wireless access points, or a wireless access point capacity of a femto gateway coupled to the at least one wireless access point.

Figure 13:
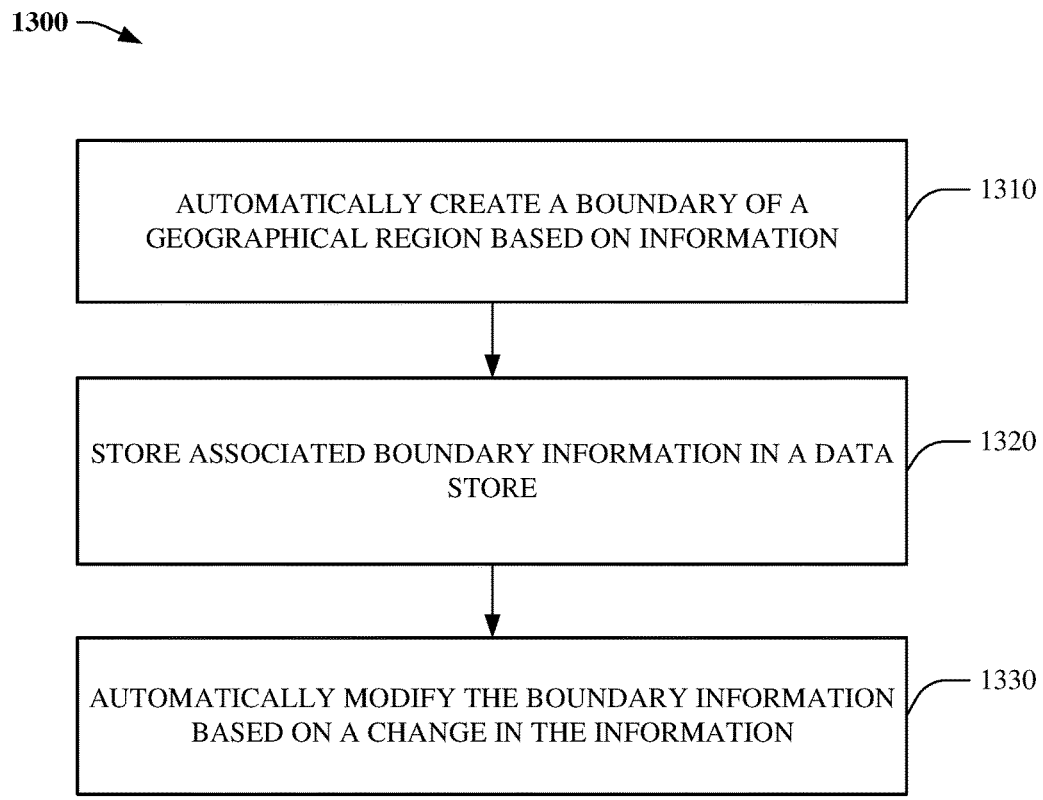

FIG. 13 illustrates another process (1300) associated with an EDS system (e.g., 130, 310, 410, 510, 600-1000, etc.), in accordance with an embodiment. At 1310, a boundary of a geographical region can be automatically created based on information. In an aspect, the information can include at least one of: a time zone, a change in a frequency of electromagnetic radiation, a change in a spectrum of frequencies of electromagnetic radiation, a distribution of an SAI within one or more geographical regions of the geographical regions, an increase in an amount of wireless access points, a decrease in the amount of the wireless access points, a utilization rate of one or more wireless access points, or a wireless access point capacity of a femto gateway coupled to the at least one wireless access point.

In another aspect (not shown), process 1300 can automatically create, based on the information described above, the boundary of the geographical region including at least one of: combining boundaries of two or more geographical regions of the geographical regions; splitting a boundary of an other geographical region of the geographical regions into at least two geographical regions; or expanding the boundary of the other geographical region. At 1320, boundary information created at 1310 can be stored in a data store of the EDS system. Further, process 1300 can automatically modify the boundary information, at 1330, based on a change in the information described above, e.g., a change in the frequency, a change in the spectrum of frequencies, etc.

Figure 14:
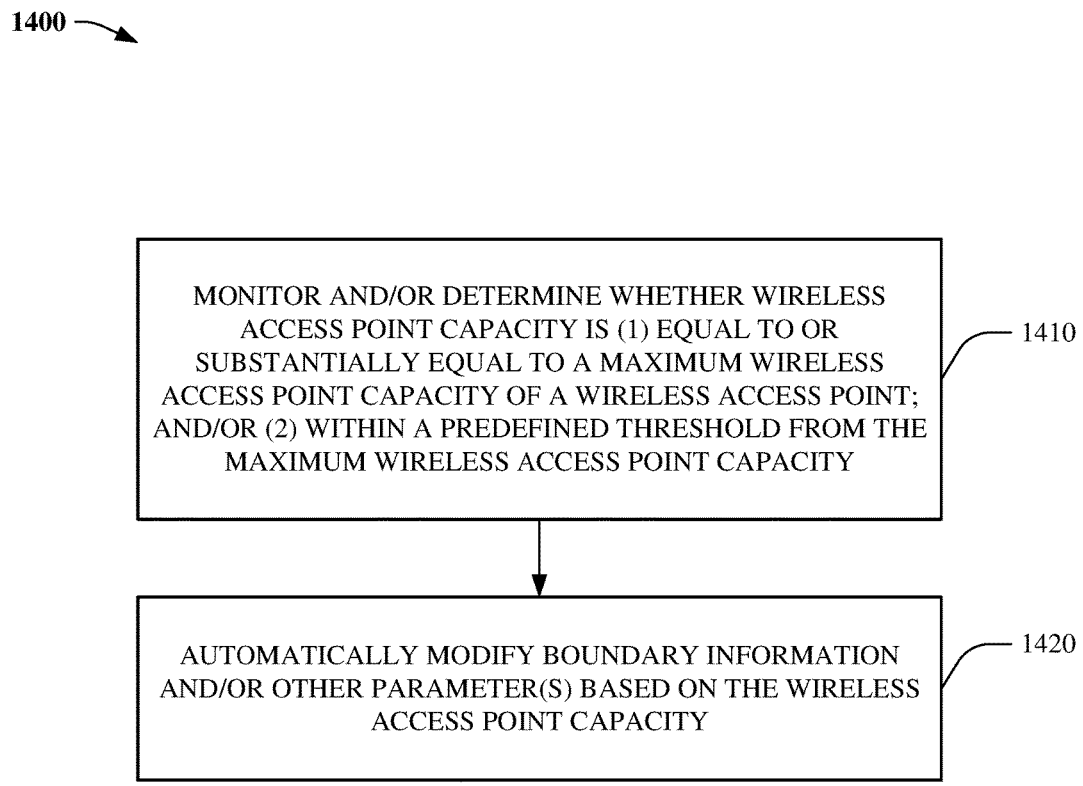

Now referring to FIG. 14, yet another process (1400) associated with an EDS system (e.g., 130, 310, 410, 510, 600-1000, etc.) is illustrated, in accordance with an embodiment. At 1410, process 1400 can monitor and/or determine whether capacity of a wireless access point, e.g., associated with transmitted LAC assignments (see above), is equal to, substantially equal to, and/or within a predefined threshold of a maximum capacity. At 1420, process 1400 can automatically modify boundary information or modify the one or more parameters, e.g., created via process 1310, for example, if process 1400 determines at 1410 that the capacity is within a predefined threshold of the maximum capacity, e.g., process 1400 can increase the size of the boundary including the wireless access point to reduce transmitted LAC collisions, or in another aspect (see process 1600 below), increase an amount of available LACs.

Figure 15:
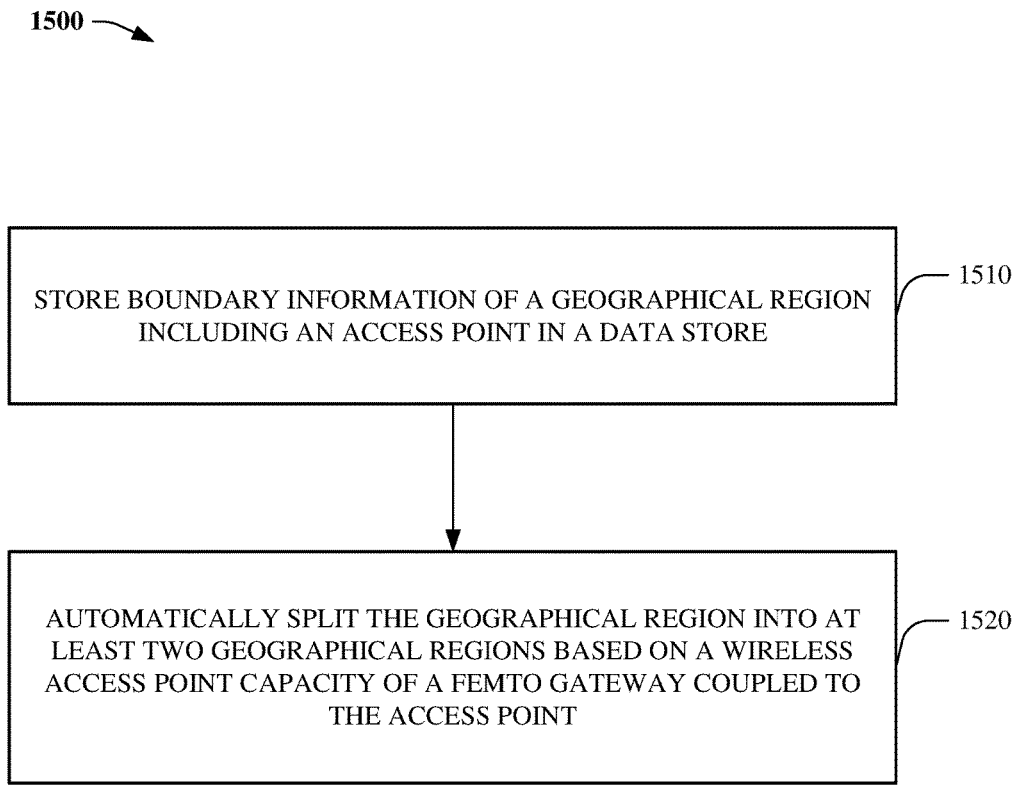

FIG. 15 illustrates a process 1500 associated with automatically splitting geographical regions via an EDS system (e.g., 130, 310, 410, 510, 600-1000, etc.), in accordance with an embodiment. At 1510, process 1500 can store boundary information of a geographical region including an access point in a data store of the ADS system. At 1520, process 1500 can automatically split the geographical region into at least two geographical regions based on a wireless access capacity of a femto gateway coupled to the access point. For example, if the wireless access capacity of the femto gateway is reached, e.g., within a predefined threshold, other FG(s) (and associated access points) can be included in a wireless network, e.g., associated with the split of the geographical region. As such, the femto gateway can service one or more access points within a geographical region of the at least two geographical regions, and at least one other femto gateway can service access point(s) of remaining geographical regions of the at least two geographical regions.

Figure 16:
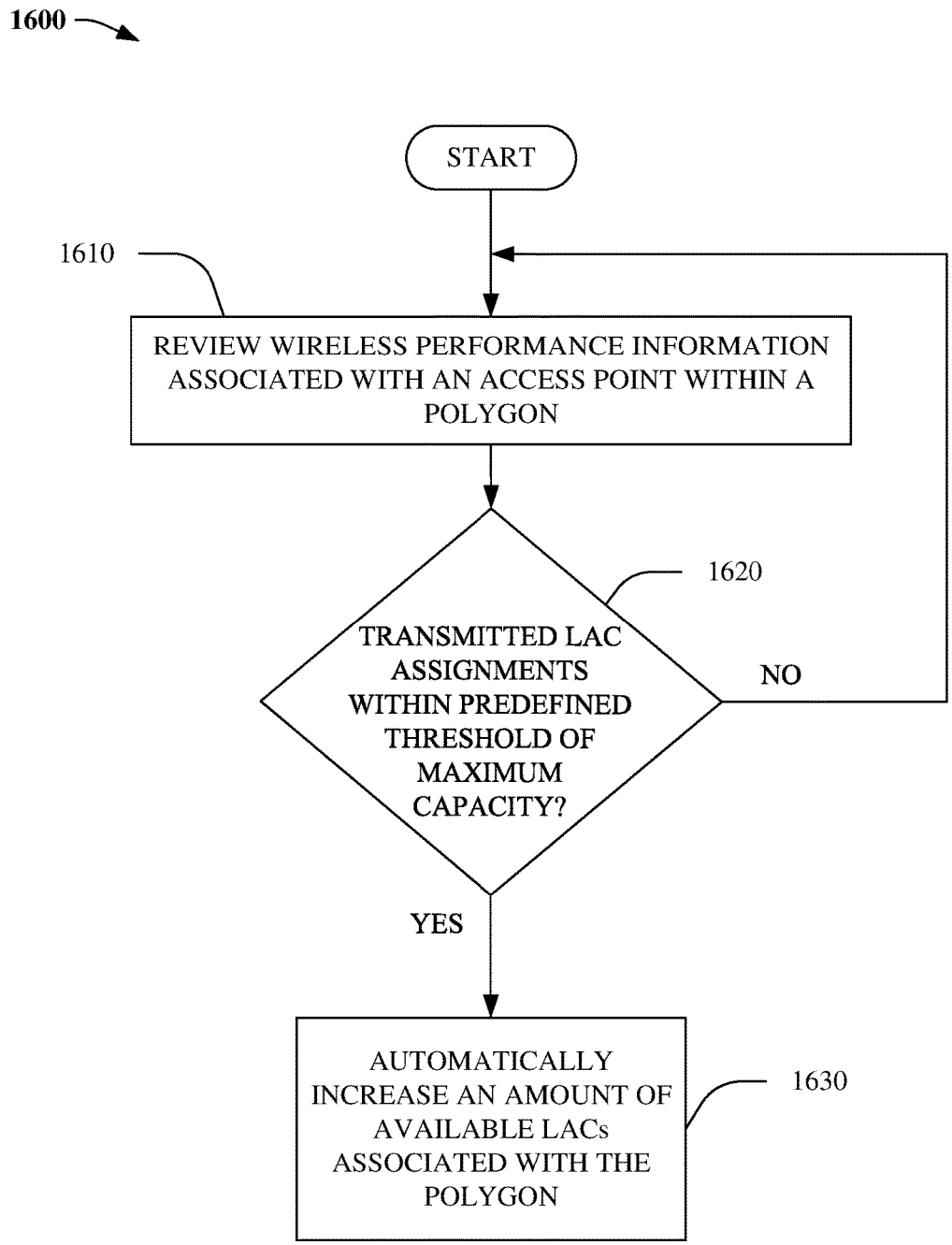

FIG. 16 illustrates a process 1600 associated with automatically increasing, via an EDS system (e.g., 130, 310, 410, 510, 600-1000, etc.), an amount of available LACs within a geographical region, in accordance with an embodiment. At 1610, process 1600 can review wireless performance information, e.g., a number of calls dropped, for example, due to overlapping coverage areas, polygons, etc. associated with an access point within a polygon. At 1620, process 1600 can determine whether transmitted LAC assignment(s) are within a predefined threshold of a maximum access point capacity; if it is determined the transmitted LAC assignment(s) are not within the predefined threshold, process 1600 flow continues to 1610. On the other hand, if it is determined the transmitted LAC assignment(s) are within the predefined threshold, process 1600 continues to 1630, at which process 1600 can automatically increase an amount of available LACs associated with the polygon.

Figure 17:
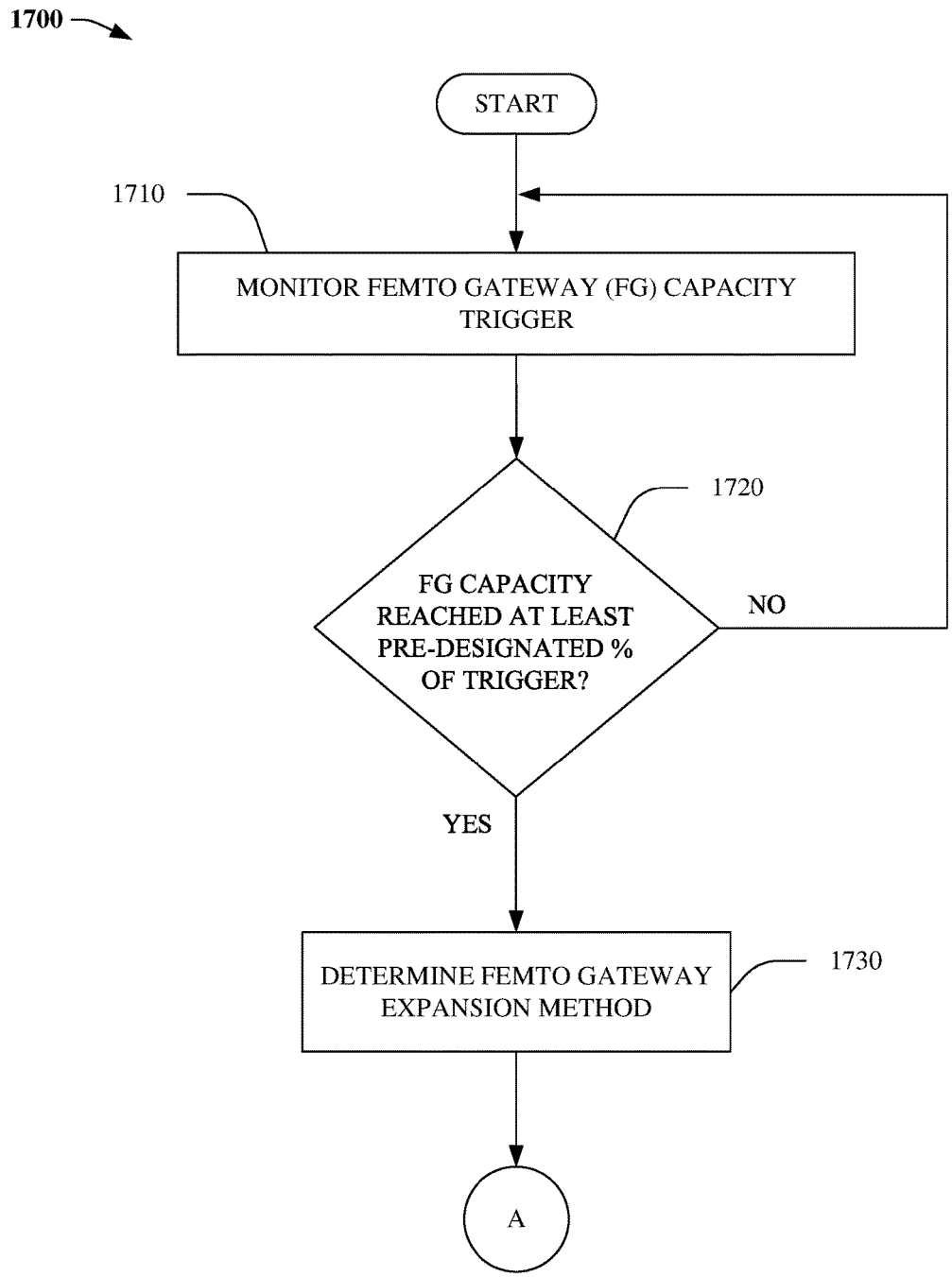
Figure 18:
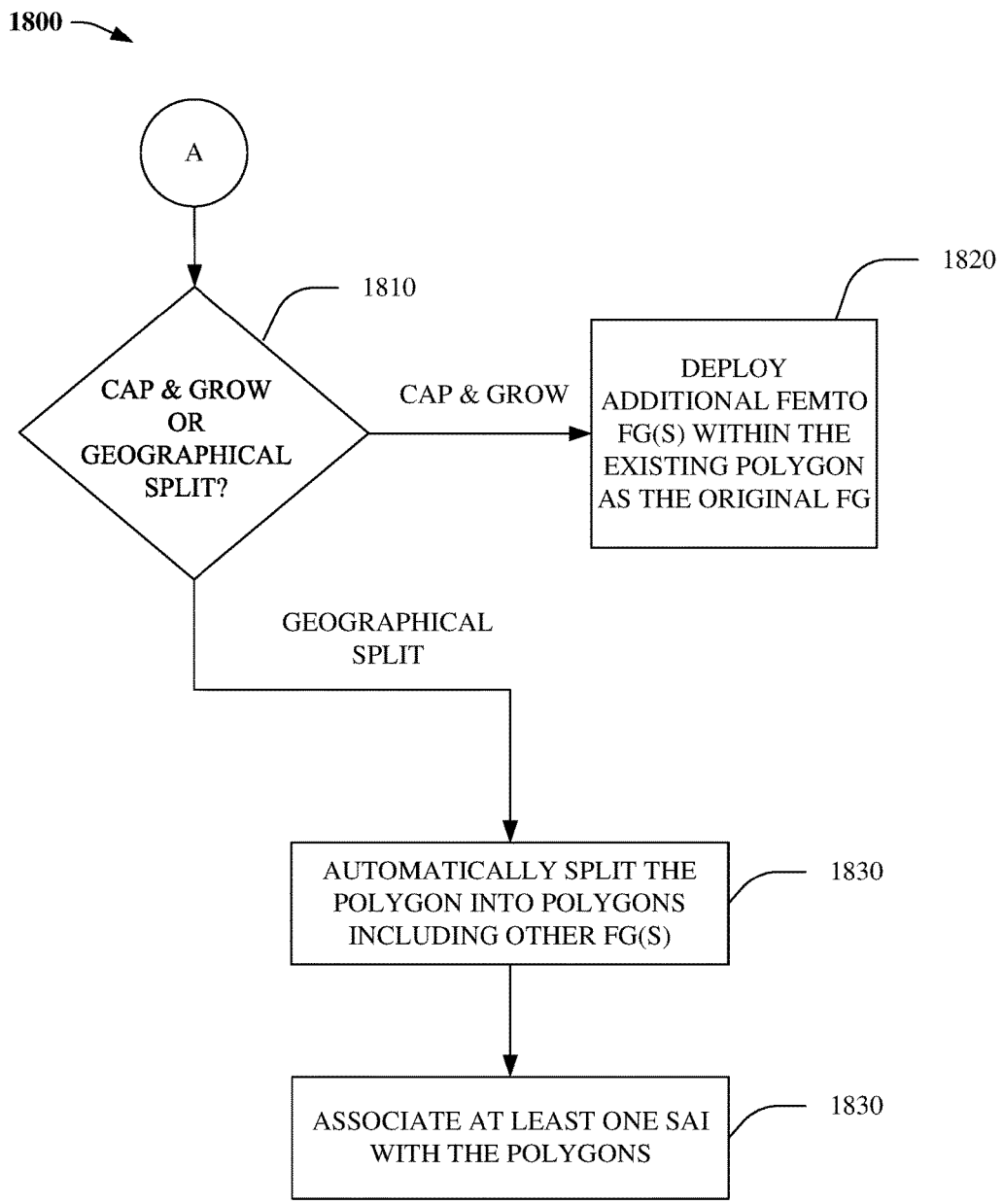

Now referring to FIGS. 17-18, processes (1700 and 1800) associated with expanding a femto gateway via an EDS system (e.g., 130, 310, 410, 510, 600-1000, etc.) are illustrated, in accordance with an embodiment. At 1710, process 1700 can monitor capacity of a femto gateway, e.g., RNC, BSC, etc. Process 1700 can determine, at 1720, whether capacity of the FG (or original FG) reached at least a pre-designated percentage of a trigger value, e.g., 80%, etc. If it is determined the capacity of the FG reached at least the pre-designated percentage of the trigger value, process 1700 can continue to 1730, at which an FG method of expansion can be determined; otherwise, flow returns to 1710.

Flow continues to process 1800, at which process 1800 can determine, at 1810, whether the FG method of expansion is "geographical split" or "cap and grow." If it is determined the FG method of expansion is cap and grow, then process 1800 continues to 1820, at which additional FG(s) can be deployed within a polygon associated with the original FG, e.g., based on load sharing of access point(s) between the original FG and the additional FG(s); otherwise, if it is determined the FG method of expansion is geographical split, then process 1800 continues to 1830, at which process 1800 can automatically split the polygon into at least two polygons (or geographical regions)—the original FG servicing one or more access points within a polygon of the at least two polygons, and at least one other femto gateway servicing other access point(s) included in remaining polygons of the at least two polygons. Process 1800 continues to 1840, at which process 1800 can associate new/previously used SAI(s) with the at least two polygons.

Figure 19:
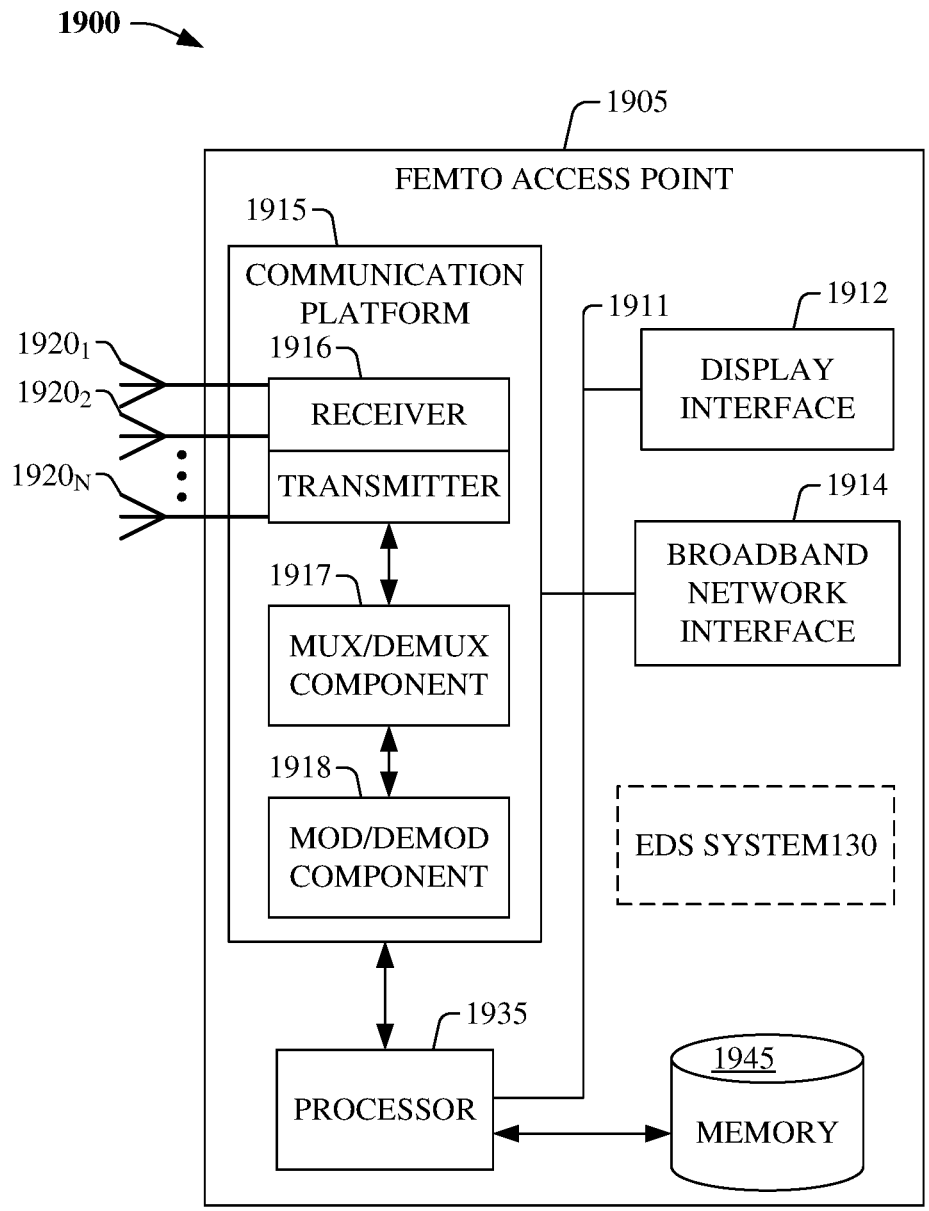
FIG. 19 illustrates a block diagram of a femto access point, in accordance with an embodiment.
Figure 20:
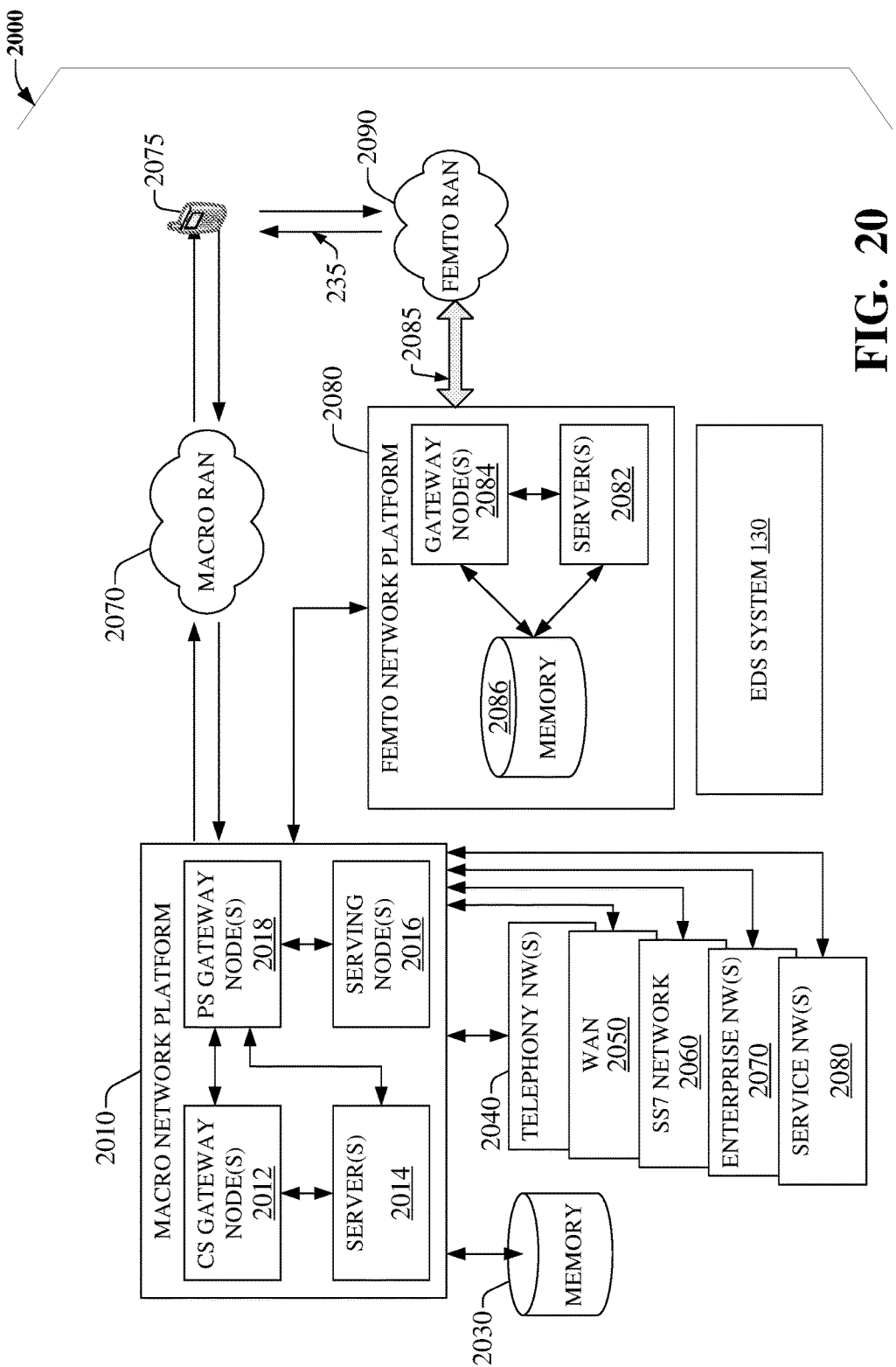
FIG. 20 illustrates a block diagram of a wireless network environment, in accordance with an embodiment.

To provide further context for various aspects of the disclosed subject matter, FIGS. 19 and 20 illustrate, respectively, a block diagram of an embodiment 1900 of a femtocell access point 1905 that can enable or exploit features and/or aspects of the disclosed subject matter; and a wireless network environment 2000 that includes femto and macro network platforms, which can enable aspects or feature of a mobile network platform as described herein, and utilize femto APs that exploit aspects of the subject innovation in accordance with various aspects of the subject specification. In embodiment 1900, femto AP 1905 can receive and transmit signal(s) from and to wireless devices, e.g., femto access points, access terminals, wireless ports and routers, or the like, through a set of antennas $1920_1$-$1920_N$ (N is a positive integer). Antennas $1920_1$-$1920_N$ are a part of communication platform 1915, which comprises electronic components and associated circuitry that provides for processing and manipulation of received signal(s) and signal(s) to be transmitted.

In an aspect, communication platform 1915 includes a receiver/transmitter 1916 that can convert analog signals to digital signals upon reception of the analog signals, and convert digital signals to analog signals upon transmission. In addition, receiver/transmitter 1916 can divide a single data stream into multiple, parallel data streams, or perform the reciprocal operation. Coupled to receiver/transmitter 1916 is a multiplexer/demultiplexer 1917 that facilitates manipulation of signal in time and frequency space. Electronic component 1917 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1917 can scramble and spread information (e.g., codes) according to substantially any code known in the art, e.g., Hadamard-Walsh codes, Baker codes, Kasami codes, polyphase codes, etc. A modulator/demodulator 1918 is also a part of communication platform 1915, and can modulate information according to multiple modulation techniques, such as frequency modulation, amplitude modulation, e.g., M-ary quadrature amplitude modulation (QAM), with M a positive integer), phase-shift keying (PSK), etc.

Femto access point 1905 also includes a processor 1935 configured to confer, at least in part, functionality to substantially any electronic component in femto AP 1905. In particular, processor 1935 can facilitate configuration of femto AP 1905 via system 600, and one or more component therein. Additionally, femto AP 1905 includes display interface 1912, which can display functions that control functionality of femto AP 1905, or reveal operation conditions thereof. In addition, display interface 1912 can include a screen to convey information to an end user. In an aspect, display interface 1912 can be a liquid crystal display (LCD), a plasma panel, a monolithic thin-film based electrochromic display, and so on. Moreover, display interface can also include a component, e.g., speaker that facilitates communication of aural indicia, which can also be employed in connection with messages that convey operational instructions to an end user. Display interface 1912 also facilitates data entry e.g., through a linked keypad or via touch gestures, which can facilitated femto AP 1905 to receive external commands, e.g., restart operation.

Broadband network interface facilitates connection of femto AP 1905 to femto network via access point backhaul link(s) 253 (not shown in FIG. 19), which enable incoming and outgoing data flow. Broadband network interface 1914 can be internal or external to femto AP 1905, and it can utilize display interface 1912 for end-user interaction and status information delivery.

Processor 1935 also is functionally connected to communication platform 1915 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1935 is functionally connected, via data, system, or address bus 1911, to display interface 1912 and broadband network interface 1914 to confer, at least in part functionality to each of such components.

In femto AP 1905, memory 1945 can retain location and/or home macro sector identifier(s); access list(s) that authorize access to wireless coverage through femto 1905; sector intelligence that includes ranking of macro sectors in the macro wireless environment of femto AP 1905, radio link quality and strength associated therewith, or the like. Memory 1945 also can store data structures, code instructions and program modules, system or device information, code sequences for scrambling, spreading and pilot transmission, femto AP floor plan configuration, and so on. Processor 1935 is coupled, e.g., via a memory bus, to memory 1945 in order to store and retrieve information necessary to operate and/or confer functionality to the components, platform, and interfaces that reside within femto access point 1905.

Now referring to FIG. 20, wireless communication environment 2000 includes two wireless network platforms: (1) macro network platform 2010 that serves, or facilitates communication with, user equipment (UE) 2075 via a macro radio access network (RAN) 2070; and (2) femto network platform 2080, which can provide communication with UE 2075 through a femto RAN 2090, which is linked to femto network platform 2080 via backhaul pipe(s) 2085, e.g., access point backhaul link(s) 253. Moreover, wireless communication environment 2000 includes EDS system 130. It should be appreciated that wireless communication environment 2000 can include aspects and/or components of the subject innovation discussed above regarding, e.g., EDS systems 130, 310, 410, 510, 600-1000, etc. Moreover, such aspects and/or components can be located/included within one or more components/elements, e.g., hardware, software, etc., of wireless communication environment 2000, e.g., macro network platform 2010, radio network 2090, and/or mobile device 2095.

It should also be appreciated that in cellular wireless technologies, e.g., 3GPP UMTS, HSPA, 3GPP LTE™, 3GPP2 UMB, GSM, etc., macro network platform 2010 is embodied in a core network. It should also be appreciated that macro network platform 2010 typically hands off UE 2075 to femto network platform 2010 once UE 2075 attaches, e.g., through macro-to-femto handover, to femto RAN 2090, which includes a set of deployed femto APs, e.g., femto AP 230, which can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 2070 can comprise various coverage cells like macro cell 205, while femto RAN 2090 can comprise multiple femtocell access points such as femto AP 230. Deployment density in femto RAN 2090 is substantially higher than in macro RAN 2070.

Generally, both macro and femto network platforms 2010 and 2080 include components, e.g., nodes, gateways, interfaces, servers, or platforms, that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 2010 includes CS gateway node(s) 2012 which can interface CS traffic received from legacy networks like telephony network(s) 2040, e.g., public switched telephone network (PSTN), or public land mobile network (PLMN), or a SS7 network 2060. Circuit switched gateway 2012 can authorize and authenticate traffic, e.g., voice, arising from such networks. Additionally, CS gateway 2012 can access mobility, or roaming, data generated through SS7 network 2060; for instance, mobility data stored in a VLR, which can reside in memory 2030. Moreover, CS gateway node(s) 2012 interfaces CS-based traffic and signaling and gateway node(s) 2018. As an example, in a 3GPP UMTS network, PS gateway node(s) 2018 can be embodied in gateway GPRS support node(s) (GGSN).

In addition to receiving and processing CS-switched traffic and signaling, PS gateway node(s) 2018 can authorize and authenticate PS-based data sessions with served, e.g., through macro RAN, wireless devices. Data sessions can include traffic exchange with networks external to the macro network platform 2010, like wide area network(s) (WANs) 2050; enterprise networks (NWs) 2070, e.g., enhanced 911, or service NW(s) 2080 like IP multimedia subsystem (IMS). It should be appreciated that local area network(s) (LANs), which can be a part of enterprise NW(s), can also be interfaced with macro network platform 2010 through PS gateway node(s) 2018. Packet-switched gateway node(s) 2018 generates packet data contexts when a data session is established. To that end, in an aspect, PS gateway node(s) 2018 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 2014. It is to be noted that in 3GPP UMTS network(s), PS gateway node(s) 2018 (e.g., GGSN) and tunnel interface (e.g., TTG) comprise a packet data gateway (PDG).

Macro network platform 2010 also includes serving node(s) 2016 that convey the various packetized flows of information, or data streams, received through PS gateway node(s) 2018. As an example, in a 3GPP UMTS network, serving node(s) can be embodied in serving GPRS support node(s) (SGSN).

As indicated above, server(s) 2014 in macro network platform 2010 can execute numerous applications, e.g., location services, online gaming, wireless banking, wireless device management, etc. that generate multiple disparate packetized data streams or flows, and manage such flows, e.g., schedule, queue, format. Such application(s), for example can include add-on features to standard services provided by macro network platform 2010. Data streams can be conveyed to PS gateway node(s) 2018 for authorization/authentication and initiation of a data session, and to serving node(s) 2016 for communication thereafter. Server(s) 2014 can also effect security, e.g., implement one or more firewalls, of macro network platform 2010 to ensure network's operation and data integrity in addition to authorization and authentication procedures that CS gateway node(s) 2012 and PS gateway node(s) 2018 can enact. Moreover, server(s) 2014 can provision services from external network(s), e.g., WAN 2050, or Global Positioning System (GPS) network(s), which can be a part of enterprise NW(s) 2080. It is to be noted that server(s) 2014 can include one or more processors configured to confer at least in part the functionality of macro network platform 2010. To that end, the one or more processors can execute code instructions stored in memory 2030, for example.

In example wireless environment 2000, memory 2030 stores information related to operation of macro network platform 2010. Information can include business data associated with subscribers; market plans and strategies, e.g., promotional campaigns, business partnerships; operational data for mobile devices served through macro network platform; service and privacy policies; end-user service logs for law enforcement; and so forth. Memory 2030 can also store information from at least one of telephony network(s) 2040, WAN 2050, SS7 network 2060, enterprise NW(s) 2070, or service NW(s) 2080.

Regarding femto network platform 2080, it can include femto gateway node(s) 2084, which have substantially the same functionality as PS gateway node(s) 2018. Additionally, femto gateway node(s) 2084 can also include substantially all functionality of serving node(s) 2016. Disparate gateway node(s) 2084 can control or operate disparate sets of deployed femto APs, which can be a part of femto RAN 2090. In an aspect of the subject innovation, femto gateway node(s) 2084 can aggregate operational data received from deployed femto APs.

Memory 2086 can retain additional information relevant to operation of the various components of femto network platform 2080. For example, operational information that can be stored in memory 2086 can comprise, but is not limited to, subscriber intelligence; contracted services; maintenance and service records; femtocell configuration, e.g., devices served through femto RAN 2090, authorized subscribers associated with one or more deployed femto APs; service policies and specifications; privacy policies; add-on features; so forth.

Server(s) 2082 have substantially the same functionality as described in connection with server(s) 2014. In an aspect, server(s) 2082 can execute multiple application(s) that provide service, e.g., voice and data, to wireless devices served through femto RAN 2090. Server(s) 2082 can also provide security features to femto network platform. In addition, server(s) 2082 can manage, e.g., schedule, queue, format, substantially all packetized flows, e.g., IP-based, frame relay-based, ATM-based, it generates in addition to data received from macro network platform 2010. Furthermore, server(s) 2082 can effect provisioning of femtocell service, and effect operations and maintenance. It is to be noted that server(s) 2082 can include one or more processors configured to provide at least in part the functionality of femto network platform 2080. To that end, the one or more processors can execute code instructions stored in memory 2086, for example.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of mobile wireless devices. A processor can also be implemented as a combination of computing processing units.

In the subject specification, terms such as "store", "data store", "data storage", "database", "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, which can be included in memory 1945, memory 2030, memory 2086, non-volatile memory 2122 (see below), disk storage 2124 (see below), and memory storage 2146 (see below) can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 21:
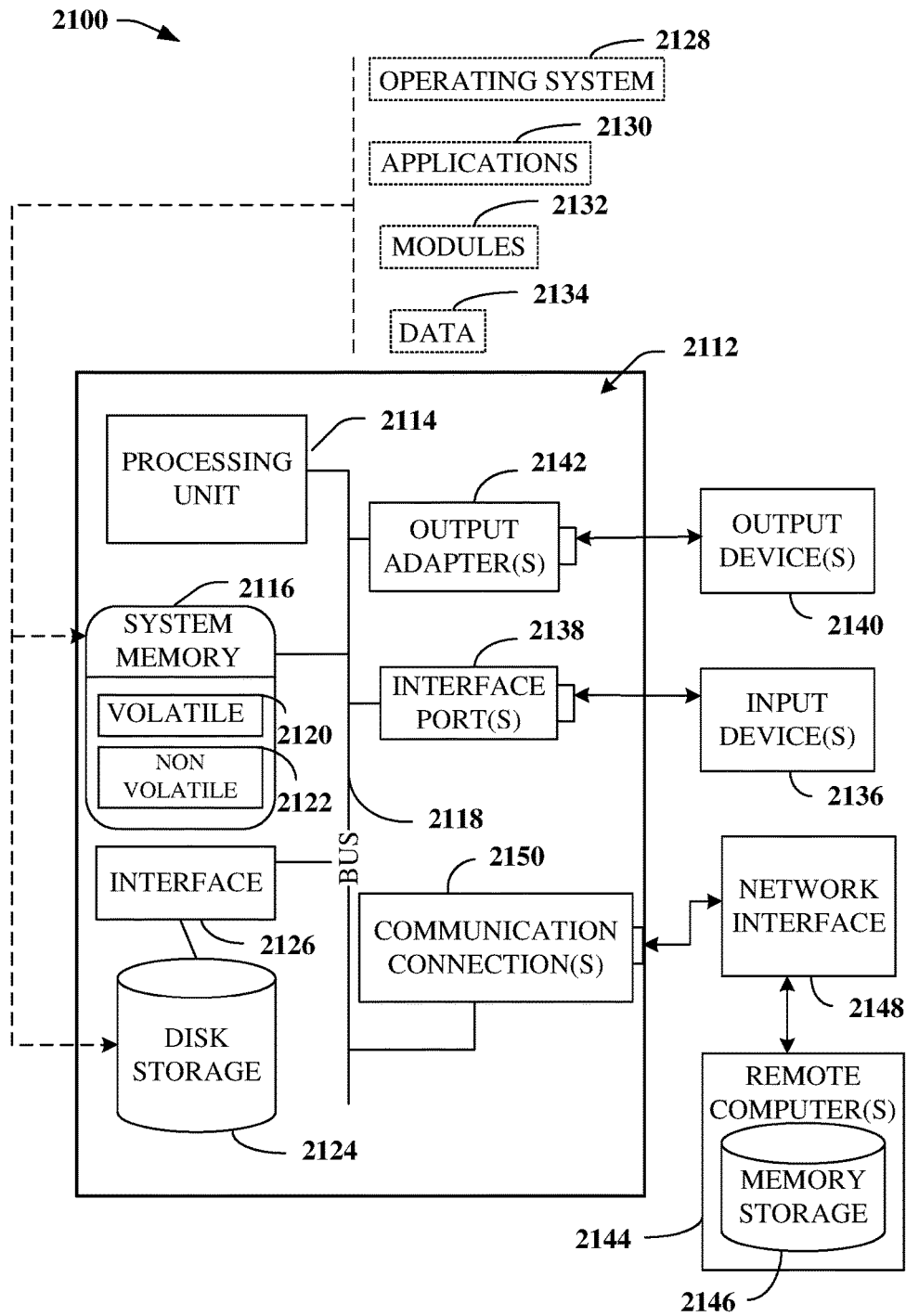
FIG. 21 illustrates a block diagram of a computer operable to execute the disclosed methods and apparatus, in accordance with an embodiment.

In order to provide a context for the various aspects of the disclosed subject matter, FIG. 21, and the following discussion, are intended to provide a brief, general description of a suitable environment in which the various aspects of the disclosed subject matter can be implemented, e.g., various systems and/or processes associated with FIGS. 1-20. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 21, a block diagram of a computing system 2100 operable to execute the disclosed systems and methods is illustrated, in accordance with an embodiment. Computer 2112 includes a processing unit 2114, a system memory 2116, and a system bus 2118. System bus 2118 couples system components including, but not limited to, system memory 2116 to processing unit 2114. Processing unit 2114 can be any of various available processors. Dual microprocessors and other multiprocessor architectures also can be employed as processing unit 2114.

System bus 2118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 2116 includes volatile memory 2120 and nonvolatile memory 2122. A basic input/output system (BIOS), containing routines to transfer information between elements within computer 2112, such as during start-up, can be stored in nonvolatile memory 2122. By way of illustration, and not limitation, nonvolatile memory 2122 can include ROM, PROM, EPROM, EEPROM, or flash memory. Volatile memory 2120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2112 can also include removable/non-removable, volatile/non-volatile computer storage media, networked attached storage (NAS), e.g., SAN storage, etc. FIG. 21 illustrates, for example, disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2124 to system bus 2118, a removable or non-removable interface is typically used, such as interface 2126.

It is to be appreciated that FIG. 21 describes software that acts as an intermediary between users and computer resources described in suitable operating environment 2100. Such software includes an operating system 2128. Operating system 2128, which can be stored on disk storage 2124, acts to control and allocate resources of computer 2112. System applications 2130 take advantage of the management of resources by operating system 2128 through program modules 2132 and program data 2134 stored either in system memory 2116 or on disk storage 2124. It is to be appreciated that the disclosed subject matter can be implemented with various operating systems or combinations of operating systems.

A user can enter commands or information into computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 2114 through system bus 2118 via interface port(s) 2138. Interface port(s) 2138 include, for example, a serial port, a parallel port, a game port, and a universal serial bus (USB). Output device(s) 2140 use some of the same type of ports as input device(s) 2136.

Thus, for example, a USB port can be used to provide input to computer 2112 and to output information from computer 2112 to an output device 2140. Output adapter 2142 is provided to illustrate that there are some output devices 2140 like monitors, speakers, and printers, among other output devices 2140, which use special adapters. Output adapters 2142 include, by way of illustration and not limitation, video and sound cards that provide means of connection between output device 2140 and system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. Remote computer(s) 2144 can be a personal computer, a server, a router, a network PC, a workstation, a microprocessor based appliance, a peer device, or other common network node and the like, and typically includes many or all of the elements described relative to computer 2112.

For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2150 refer(s) to hardware/software employed to connect network interface 2148 to bus 2118. While communication connection 2150 is shown for illustrative clarity inside computer 2112, it can also be external to computer 2112. The hardware/software for connection to network interface 2148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

in response to determining, by a system comprising a processor, that a separation between a first wireless access point device of a first geographical region and a second wireless access point device of a second geographical region satisfies a defined condition representing an elimination of a collision of respective transmissions of a location code by the first wireless access point device and the second wireless access point device, assigning, by the system, the location code to the first wireless access point device and the second wireless access point device; and in response to the assigning, remotely configuring, by the system, the first wireless access point device and the second wireless access point device to broadcast the location code to a mobile device to facilitate generation, by the mobile device using the location code, of respective location update requests by the mobile device representing that the mobile device has moved within the first geographical region or the second geographical region.

2. The method of claim 1, wherein the assigning the location code comprises determining the location code based on an electromagnetic spectrum condition related to the first geographical region.

3. The method of claim 1, wherein the assigning the location code comprises determining the location code based on a billing identification corresponding to the first wireless access point device.

4. The method of claim 1, wherein the remotely configuring comprises:

caching an instruction in a data store associated with the first wireless access point device; and based on the instruction, remotely configuring the first wireless access point device to broadcast the location code to the mobile device.

5. The method of claim 1, further comprising:

storing, by the system, boundary information representing a boundary of the first geographical region in a data store; and modifying, by the system, the boundary information based on a determined change in a capacity of a femto gateway device coupled to the first wireless access point device.

6. The method of claim 5, wherein the modifying comprises:

in response to determining that the capacity of the femto gateway device satisfies a defined condition representing a decrease of a wireless communication capacity of the femto gateway device, separating the boundary into boundaries.

7. The method of claim 1, further comprising:

storing, by the system, boundary information representing a boundary of the first geographical region in a data store; and modifying, by the system, the boundary information based on a defined time zone corresponding to the first geographical region.

8. A system, comprising:

a processor; and a memory that stores executable instructions that, when executed by the processor, facilitate performance of operations, comprising:

based on a distance between a first wireless access point device and a second wireless access point device being determined to satisfy a defined condition representing a decrease in respective transmission collisions of a location code, assigning the location code to the first wireless access point device and the second wireless access point device, wherein a transmission collision of the respective transmission collisions represents that the location code has been received, by a wireless device, from the first wireless access point device and the second wireless access point device within a common reception area; and in response to the assigning, remotely initiating the first wireless access point device and the second wireless access point device to broadcast the location code to the wireless device to facilitate generation, based on the location code, of respective location update requests by the wireless device indicating that the mobile device has moved within respective broadcast areas of the first wireless access point device and the second wireless access point device.

9. The system of claim 8, wherein the assigning the location code comprises selecting the location code based on a billing identification associated with the first wireless access point device.

10. The system of claim 8, wherein the operations further comprise:

in response to determining that the first wireless access point device is not configured to use the location code during a wireless communication, re-initiating the configuration of the first wireless access point device.

11. The system of claim 8, wherein the operations further comprise:

splitting a geographical region representing a wireless coverage area of the first wireless access point device into polygons based on a wireless access capacity of a femto gateway device communicatively coupled to the first wireless access point device.

12. The system of claim 8, wherein the operations further comprise:

in response to detecting an increase, within a geographical region, in an amount of wireless access point devices comprising the first wireless access point device and the second wireless access point device, modifying boundary information representing the distance between the first wireless access point device and the second wireless access point device.

13. The system of claim 8, wherein the operations further comprise:

measuring a utilization rate representing a distribution, among wireless access point devices comprising the first wireless access point device and the second wireless access point device, of location codes comprising the location code; and based on the utilization rate, modifying boundary information representing the distance between the first wireless access point device and the second wireless access point device.

14. A non-transitory machine-readable storage medium, comprising executable instructions that, when executed by a processor, facilitate performance of operations, comprising:

based on a separation of a first wireless access point device from a second wireless access point device being determined to satisfy a defined condition representing a reduction in transmission collisions of a location code, assigning the location code to the first wireless access point device and the second wireless access point device, wherein a transmission collision of the transmission collisions represents that a wireless device has received the location code from the first wireless access point device and the second wireless access point device within a common transmission area of the first wireless access point device and the second wireless access point device; and in response to the assigning, remotely initiating respective configurations of the first wireless access point device and the second wireless access point device to facilitate respective receptions of the location code by the wireless device within different transmission areas of the first wireless access point device and the second wireless access point device, wherein the remotely initiating comprises facilitating generation, by the wireless device using the location code, of respective location update requests representing that the wireless device has moved within a first transmission area of the different transmission areas of the first wireless access point device or a second transmission area of the different transmission areas of the second wireless access point device.

15. The non-transitory machine-readable storage medium of claim 14, wherein the operations further comprise:

in response to determining that the first wireless access point device is not configured to use the location code during a wireless communication, re-initiating a configuration of the first wireless access point device.

16. The non-transitory machine-readable storage medium of claim 14, wherein the operations further comprise:

in response to determining that a capacity of a gateway device communicatively coupled to the first wireless access point device has decreased, splitting a polygon representing a boundary of a geographical region corresponding to the first wireless access point device into different polygons.

17. The non-transitory machine-readable storage medium of claim 14, wherein the operations further comprise:

based on a defined time zone, modifying a polygon representing a boundary of a geographical region corresponding to the first wireless access point device.

18. The non-transitory machine-readable storage medium of claim 14, wherein the operations further comprise:

modifying a polygon representing a boundary of a geographical region corresponding to the first wireless device based on a determined change in a capacity of a gateway device communicatively coupled to the first wireless access point device.

19. The non-transitory machine-readable storage medium of claim 18, wherein the modifying comprises:

in response to the capacity of the gateway device being determined to decrease, separating the boundary into separate boundaries.

20. The non-transitory machine-readable storage medium of claim 14, wherein the operations further comprise:

determining the location code based on an electromagnetic spectrum condition related to the first geographical region.

* * * * *